US012455521B2

(12) United States Patent
Isono

(10) Patent No.: US 12,455,521 B2
(45) Date of Patent: Oct. 28, 2025

(54) IMAGE FORMING APPARATUS

(71) Applicant: CANON KABUSHIKI KAISHA, Tokyo (JP)

(72) Inventor: Aoji Isono, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 662 days.

(21) Appl. No.: 17/872,089

(22) Filed: Jul. 25, 2022

(65) Prior Publication Data

US 2023/0033004 A1 Feb. 2, 2023

(30) Foreign Application Priority Data

Jul. 30, 2021 (JP) ................................ 2021-125555

(51) Int. Cl.
*G03G 15/20* (2006.01)
*G05F 1/46* (2006.01)

(52) U.S. Cl.
CPC ......... *G03G 15/2039* (2013.01); *G05F 1/463* (2013.01); *G03G 2215/00978* (2013.01)

(58) Field of Classification Search
CPC ...... G03G 15/2039; G03G 2215/00978; G05F 1/463
See application file for complete search history.

(56) References Cited

U.S. PATENT DOCUMENTS 7,199,335 B2 4/2007 Takami et al.
10,866,546 B2 12/2020 Isono et al.
2020/0103795 A1 * 4/2020 Isono ................ G03G 15/2053

FOREIGN PATENT DOCUMENTS

JP H0444075 A 2/1992
JP 2005321573 A 11/2005
JP 2007212502 A 8/2007
JP 2008164973 A * 7/2008
JP 2008268629 A * 11/2008
JP 2014126684 A 7/2014
JP 2020052233 A 4/2020

OTHER PUBLICATIONS

English machine translation of the description of JP-2008164973-A (Year: 2008).*
English machine translation of the description of JP-2008268629-A (Year: 2008).*

* cited by examiner

*Primary Examiner* — Mark F. Huff
*Assistant Examiner* — Boone Alexander Evans
(74) *Attorney, Agent, or Firm* — ROSSI, KIMMS & McDOWELL LLP

(57) ABSTRACT

An image forming apparatus includes a fixing member, a heating portion configured to heat the fixing member by being supplied with electric power, a power source configured to supply electric power to the heating portion, a temperature detector, a controller configured to control power supply from the power source to the heating portion based on the output voltage from the temperature detector, a reference voltage generator configured to generate a reference voltage, and a breaker configured to stop the power supply from the power source to the heating portion. The reference voltage generator is configured to output the reference voltage that changes with time having elapsed since a start of heating at which the power supply to the heating portion was started by the controller.

15 Claims, 26 Drawing Sheets

NORMAL PRINT

FAILURE IN TEMPERATURE ADJUSTMENT

HEATING IN STOP STATE

HEATING IN STOP STATE (FIXING FILM TEMPERATURE AT PRINT START : 25°C)

HEATING IN STOP STATE (FIXING FILM TEMPERATURE AT PRINT START : 100°C)

NORMAL PRINT (FIXING FILM TEMPERATURE AT PRINT START : 100°C)

NORMAL PRINT

FAILURE IN TEMPERATURE ADJUSTMENT

HEATING IN STOP STATE

HEATING IN STOP STATE (FIXING FILM TEMPERATURE AT PRINT START : 25°C)

HEATING IN STOP STATE (FIXING FILM TEMPERATURE AT PRINT START : 100°C)

NORMAL PRINT (FIXING FILM TEMPERATURE AT PRINT START : 100°C)

IMAGE FORMING APPARATUS

BACKGROUND OF THE INVENTION

Field of the Invention

The present invention relates to an image forming apparatus including a fixing apparatus that fixes a toner image formed on a recording material, to the recording material.

Description of the Related Art

An electrophotographic image-forming apparatus, such as a printer, a copying machine, or a multifunction printer, includes a fixing apparatus having a heat fixing system. The fixing apparatus fixes a toner image formed on a recording material, such as a paper sheet, to the recording material by heating the toner image. The fixing apparatus having a heat fixing system includes a fixing member (heating member) that contacts a recording material, and a heating portion that heats the fixing member. Examples of the heat fixing system include a film heating system, an induction heating system, and a heat roller system. The film heating system heats a tubular film by using a ceramic heater that is in contact with the inner surface of the film. The induction heating system heats a hollow-cylinder-shaped rotary member including a conductive layer, by using induction heating. The heat roller system heats a hollow roller by using radiant heat radiated from a halogen lamp or the like. Japanese Patent Application Publication No. H04-44075 describes a fixing apparatus having a film heating system, and Japanese Patent Application Publication No. 2020-52233 describes a fixing apparatus having an induction heating system.

The fixing apparatus having a heat fixing system may cause temperature rise of an end portion of the fixing member, or overheating of the fixing member. Specifically, when the fixing apparatus successively fixes toner images to a plurality of small-size recording materials, the temperature of the end portion of the fixing member may rise because the small-size recording materials do not contact the end portion when passing through the fixing apparatus. The overheating of the fixing member occurs if the amount of energization of the heating portion cannot be controlled, for example, due to the failure of a driving circuit. Thus, for preventing troubles caused by the overheat state, such a fixing apparatus includes a safety device that detects an abnormal heating state and stops the energization of the heating portion. Japanese Patent Application Publication No. 2007-212502 describes a technique for preventing the overheating. In this technique, a threshold temperature for detecting the abnormal heating by using a thermistor is changed in accordance with the amount of current of the heater. As a result, the malfunction of the safety device caused by the temperature rise of the end portion of the fixing member is prevented in the normal operation, while the energization of the heater is stopped in an early stage if the energization is out of control.

In the configuration described in Japanese Patent Application Publication No. 2007-212502, a detection signal (voltage) from the thermistor and a reference voltage, which represents a threshold temperature for detecting the abnormal heating, are compared with each other by a comparator for determining an abnormal heating state, and the reference voltage is changed in accordance with the amount of current of the heater. In this configuration, however, a delay time occurs. The delay time is a period of time from when the amount of current of the heater changes until the state of the circuit is changed and the reference voltage changes. By the way, the temperature of the heater may rise rapidly, depending on the cause of occurrence of the abnormal heating in the fixing apparatus. Thus, in the configurations described in Japanese Patent Application Publication No. 2007-212502, if an error occurs and the temperature of the heater rises rapidly, the temperature of the heater will continue to rise even in the delay time in which the state of the circuit is changed. For this reason, it has been desired to quickly stop the energization of the heating portion if an error occurs and the temperature of the heating portion rises rapidly.

SUMMARY OF THE INVENTION

The present invention provides an image forming apparatus that can stop power supply in case of an abnormality accompanying rapid temperature rise.

According to one aspect of the invention, an image forming apparatus includes a fixing member configured to fix a toner image transferred onto a recording material, to the recording material by heating the toner image, a heating portion configured to heat the fixing member by being supplied with electric power, a power source configured to supply electric power to the heating portion, a temperature detector configured to output an output voltage that corresponds to a temperature of the fixing member or a temperature of the heating portion, a controller configured to control power supply from the power source to the heating portion based on the output voltage from the temperature detector, such that the temperature of the fixing member is maintained at a predetermined temperature, a reference voltage generator configured to generate a reference voltage, and a breaker configured to stop the power supply from the power source to the heating portion if a temperature that corresponds to the output voltage from the temperature detector becomes higher than a temperature that corresponds to the reference voltage, wherein the reference voltage generator is configured to output the reference voltage that changes with time having elapsed since a start of heating at which the power supply to the heating portion was started by the controller, such that a temperature corresponding to the reference voltage obtained when a first time has elapsed since the start of heating is lower than a temperature corresponding to the reference voltage obtained when a second time longer than the first time has elapsed since the start of heating.

Further features of the present invention will become apparent from the following description of exemplary embodiments with reference to the attached drawings.

DESCRIPTION OF THE EMBODIMENTS

Hereinafter, some embodiments of the present disclosure will be described with reference to the accompanying drawings.

Figure 26:
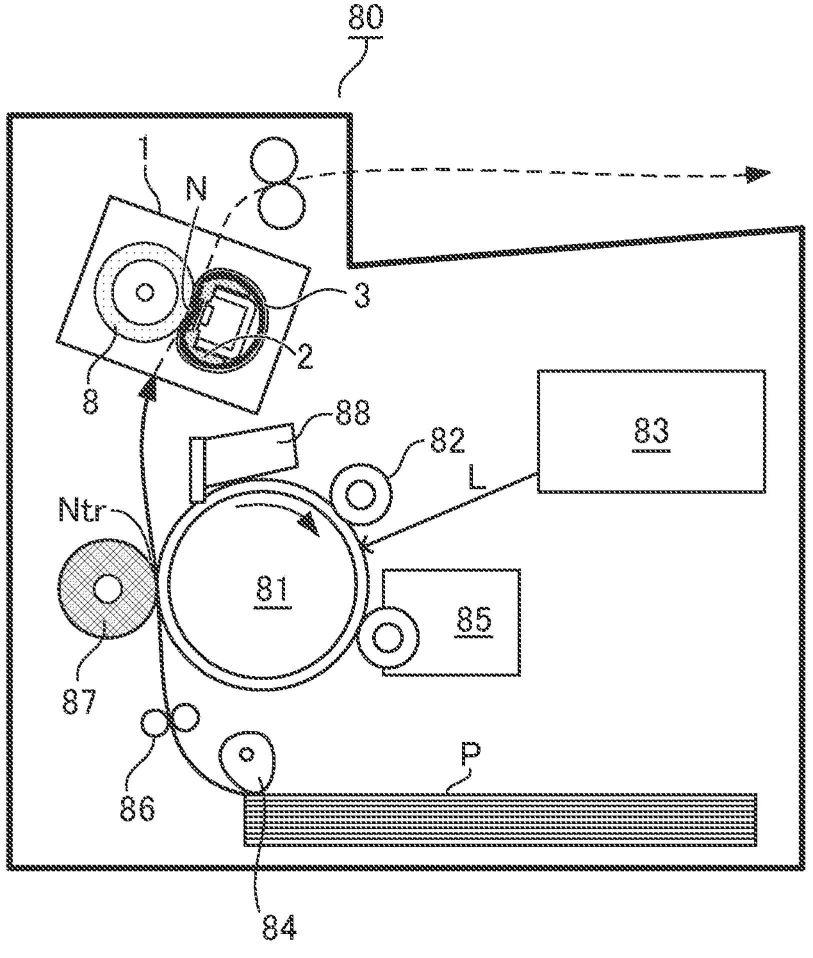
FIG. 26 is a schematic diagram of an image forming apparatus including a fixing apparatus.

In each embodiment described below, an example of a configuration of a fixing apparatus disposed in an electrophotographic image forming apparatus will be described. First, one example of the image forming apparatus including a fixing apparatus will be described with reference to a schematic diagram illustrated in FIG. 26. An image forming apparatus 80 is an electrophotographic monochrome laser-beam printer that transfers a toner image formed on a photosensitive drum 81, directly to a recording material P. The photosensitive drum 81 that serves as an image bearing member is a photoreceptor in electrophotography, which is formed like a drum (cylinder). Around the photosensitive drum 81, a charger 82, an exposure apparatus 83, a development unit 85, a transfer roller 87, and a drum cleaner 88 are disposed in this order in a rotational direction (i.e., a clockwise direction in FIG. 26). The photosensitive drum 81, the charger 82, the exposure apparatus 83, the development unit 85, the transfer roller 87, and the drum cleaner 88 constitute an image forming unit (process unit), and the image forming unit constitutes a toner-image forming portion that forms a toner image on a recording material.

Next, a flow of image forming operations (print operations) performed by the image forming apparatus 80 will be described. When the image forming apparatus 80 receives image information and an image forming instruction (print instruction), the photosensitive drum 81 is driven and rotated in a direction indicated by an arrow in FIG. 26, and a charging process is performed on the surface of the photosensitive drum 81 by the charger 82 so that the surface of the photosensitive drum 81 has a predetermined polarity. Then, the charged surface of the photosensitive drum 81 is irradiated with a laser beam L modulated by the exposure apparatus 83 in accordance with the image information, so that an electrostatic latent image is formed on the surface of the photosensitive drum 81. The developer that contains charged toner is borne by a developing roller of the development unit 85, and then sticks to the photosensitive drum 81 in accordance with the distribution of surface potential of the photosensitive drum 81. As a result, the electrostatic latent image on the photosensitive drum 81 is developed and visualized as a toner image.

In synchronization with the above-described process, the recording material P is fed, one by one, by a feed roller 84; and is conveyed toward a transfer nip Ntr by a conveyance roller 86. The transfer nip Ntr that serves as a transfer portion in which a toner image is transferred is a nip portion formed between the photosensitive drum 81 and a transfer roller 87. When the transfer roller 87 is applied by a power supply (not illustrated), with a voltage having a polarity opposite to the normal polarity of charged toner, the toner image on the photosensitive drum 81 is transferred to the recording material Pin the transfer nip Ntr. The surface of the photosensitive drum 81 having passed through the transfer nip Ntr is cleaned by the drum cleaner 88 that includes a cleaning member, such as a blade that is an elastic member in contact with the surface of the photosensitive drum 81, so that the sticking substance, such as transfer residual toner, is removed.

The recording material P having passed through the transfer nip Ntr and bearing a toner image still not fixed to the recording material P is conveyed to a fixing apparatus 1, and is subjected to a heat fixing process by the fixing apparatus 1. Then, the recording material P is discharged, as a resulting object, to the outside of the image forming apparatus 80 by a discharging roller pair. The fixing apparatus 1 may have a known heat fixing system, such as a film heating system or an induction heating system, which will be specifically described in the following embodiments.

Note that although the direct-transfer image forming unit that directly transfers a toner image from the image bearing member to the recording material has been described as an example, the image forming unit may have an intermediate transfer system that primarily transfers a toner image from the image bearing member to an intermediate transfer member, such as an intermediate transfer belt, and then secondarily transfers the toner image from the intermediate transfer member to the recording material. In another case, the image forming unit, which serves as a toner-image forming portion, may include a plurality of image bearing members. In this case, the image forming unit forms a full-color toner image by superposing toner images having a plurality of colors on the recording material such that one toner image is put on another. The image forming apparatus may not be a printer, which forms an image on a recording material in accordance with image information sent from an external apparatus. For example, the image forming apparatus may be a copying machine that forms an image on a recording material in accordance with image information that has been read from a document, or may be a multifunction printer that includes a plurality of functions.

First Embodiment

Figure 1:
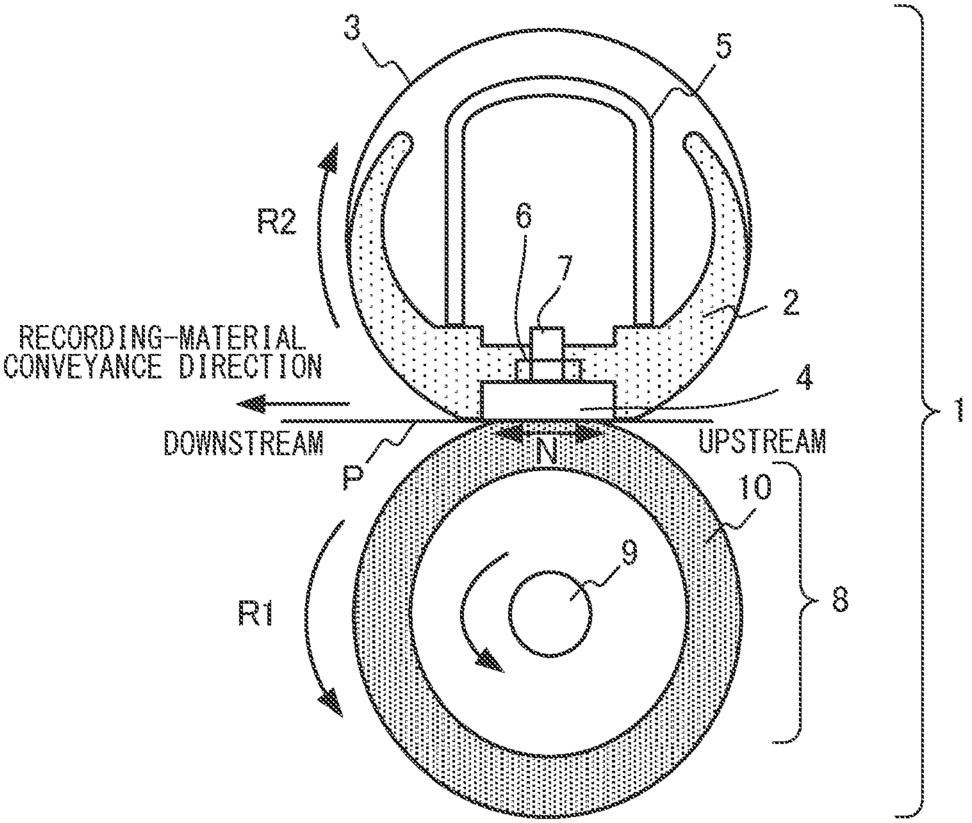
FIG. 1 is a schematic diagram of a fixing apparatus of a first embodiment.

FIG. 1 is a cross-sectional view of a fixing apparatus 1 of a first embodiment. The fixing apparatus 1 includes a fixing film 3 that is a flexible tubular film member, a heater 4 that is in contact with the inner surface of the fixing film 3, a pressing roller 8 that serves as a facing member that faces the heater 4 via the fixing film 3, and a metal stay 5. Hereinafter, a direction in which the recording material P is conveyed through a fixing nip N is defined as a recording-material conveyance direction, and the longitudinal direction of the fixing nip N (i.e., a direction perpendicular to the recording-material conveyance direction, or a rotation-axis direction of the pressing roller 8) is defined as a longitudinal direction of the fixing apparatus 1.

The fixing apparatus 1 is a heat fixing apparatus having a film heating system, which has excellent quick-start performance (i.e., short warm-up time). In particular, the heater 4 is an integrated ceramic heater in which a heating element (i.e., a resistor that generates heat), which generates heat while energized, is buried in an insulating substrate made of aluminum oxide ($Al_2O_3$) or aluminum nitride (AlN). That is, the heater is a plate-shaped heater in which the resister, which generates heat and which is formed in a predetermined pattern, is buried in a ceramic material having insulation properties. However, the heater 4 may be another heater having a different structure. For example, the heater 4 may be a heater in which a resistor that generates heat is formed on an insulating layer (made of glass, for example) formed on a metal substrate.

The fixing film 3 is a multi-layered heat-resistant film formed into a tubular shape (i.e., an endless belt), and includes a base layer and a release layer formed on the base layer (on the front surface side). The base layer is made of conductive resin or conductive metal, which is heat-resistant and has high thermal conductivity. The conductive resin is made by adding conductive fine particles, such as carbon black, to a heat-resistant resin such as polyimide, polyamide-imide, or polyether ether ketone (PEEK). The conductive metal may be pure metal, such as aluminum (Al), nickel (Ni), copper (Cu), or zinc (Zn), or alloy such as stainless steel. The release layer is formed by covering the base layer with a heat-resistant resin, such as tetrafluoroethylene-perfluoroalkylvinyl ether copolymer (PFA), that has excellent separation property, for preventing the toner from sticking to the fixing film 3 and for reliably separating the recording material P from the fixing film 3.

The pressing roller 8 includes a core metal 9 made of a material, such as iron or aluminum; and an elastic layer 10 made of a material, such as a silicone rubber, and formed on the outer circumferential surface of the core metal 9. The heater 4 is held by a heater holding member 2 made of heat-resistant resin, and heats the fixing film 3. The heater holding member 2 also has a guide function to guide the rotation of the fixing film 3. The metal stay 5 receives pressure applying force from a pressing spring (not illustrated), and urges the heater holding member 2 toward the pressing roller 8. The fixing nip N is an area in which the pressing roller 8 is in pressure contact with the heater 4 via the fixing film 3. The heater 4 and the heater holding member 2 are disposed inside (i.e., in an internal space of) the fixing film 3. The heater 4, the heater holding member 2, and the pressing roller 8 are a nip forming unit that forms the fixing nip N, which is a nip portion. The pressing roller 8 receives power from a motor (not illustrated), and rotates in a direction indicated by an arrow R1. The fixing film 3 is rotated in a direction indicated by an arrow R2, by the rotation of the pressing roller 8.

The fixing apparatus 1 rotates the pressing roller 8 while energizing the heater 4, so that a toner image on the recording material P is fixed to the recording material P by the fixing film 3 heated by non-radiant heat from the heater 4, while the recording material P is nipped and conveyed by the fixing film 3 and the pressing roller 8 in the fixing nip N. That is, the fixing film 3 is a fixing member of the present embodiment, and the heater 4 is a heating portion of the present embodiment.

A temperature detection element 6 is one example of a temperature detector, and is in contact with the heater 4. For example, the temperature detection element 6 outputs a voltage, as a detection signal, that corresponds to a temperature of the heater 4. For controlling the energization of the heater 4, a below-described controller 11 (FIG. 3) controls the duty ratio or the frequency of an alternating voltage applied to the heater 4, in accordance with the output signal from the temperature detection element 6. With this control, the temperature in the fixing nip N is kept at a predetermined temperature (i.e., a temperature into which the temperature of the fixing nip N is controlled) suitable for fixing a toner image to the recording material. In addition, a safety element 7 is also in contact with the heater 4. The safety element 7 may be a thermo switch or a thermal fuse, which stops the energization of the heater 4 if the heater 4 is abnormally heated.

Figure 2:
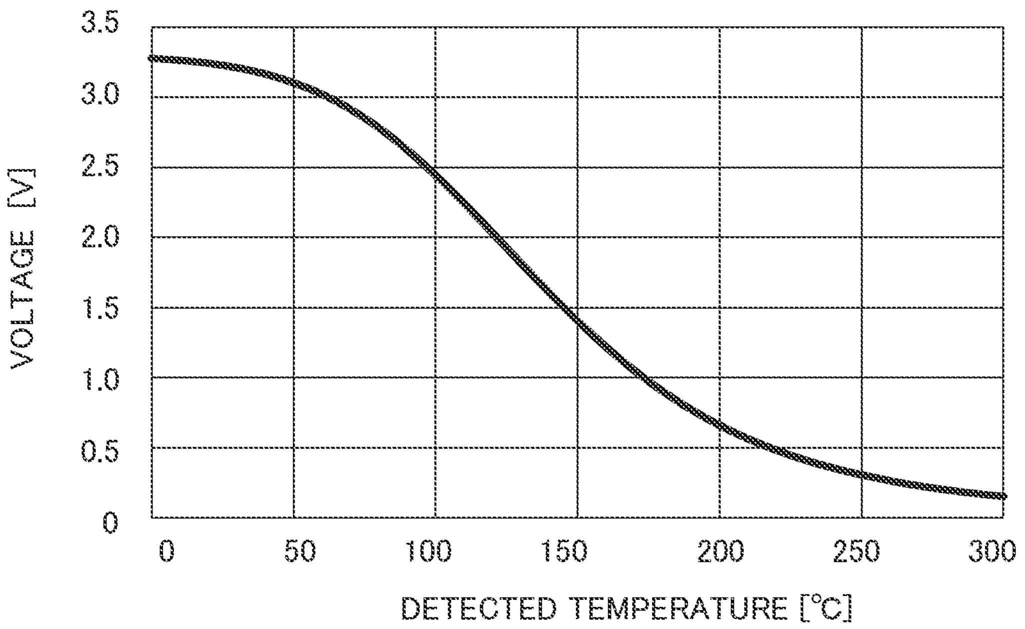
FIG. 2 is a graph illustrating temperature characteristics of a temperature detection element of the first embodiment.

As illustrated in FIG. 2, the temperature detection element 6 has characteristics in which the output voltage decreases (i.e., decreases monotonously) as the detected temperature increases. The detected temperature is a temperature of a surface of the heater 4 that is in contact with the temperature detection element 6. For example, if values of the detected temperature are a first temperature (e.g., 100° C.) and a second temperature (e.g., 200° C.) higher than the first temperature, the output voltage corresponding to the second temperature is lower than the output voltage corresponding to the first temperature. In general, the control method described below can be applied to a temperature detection member having the characteristics in which the output voltage decreases as the detected temperature increases. In the present embodiment, a thermistor is used as the temperature detection element 6.

Simplified Description of Excessive-Temperature-Rise Prevention Circuit

Figure 3:
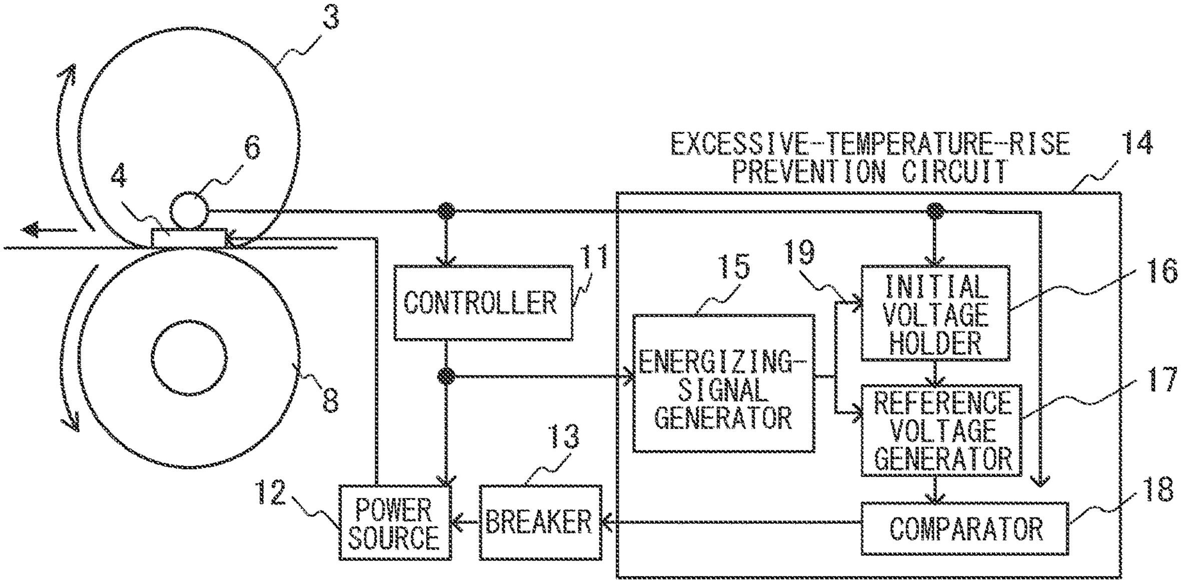
FIG. 3 is a block diagram illustrating a configuration of control of the fixing apparatus of the first embodiment.
Figure 4:
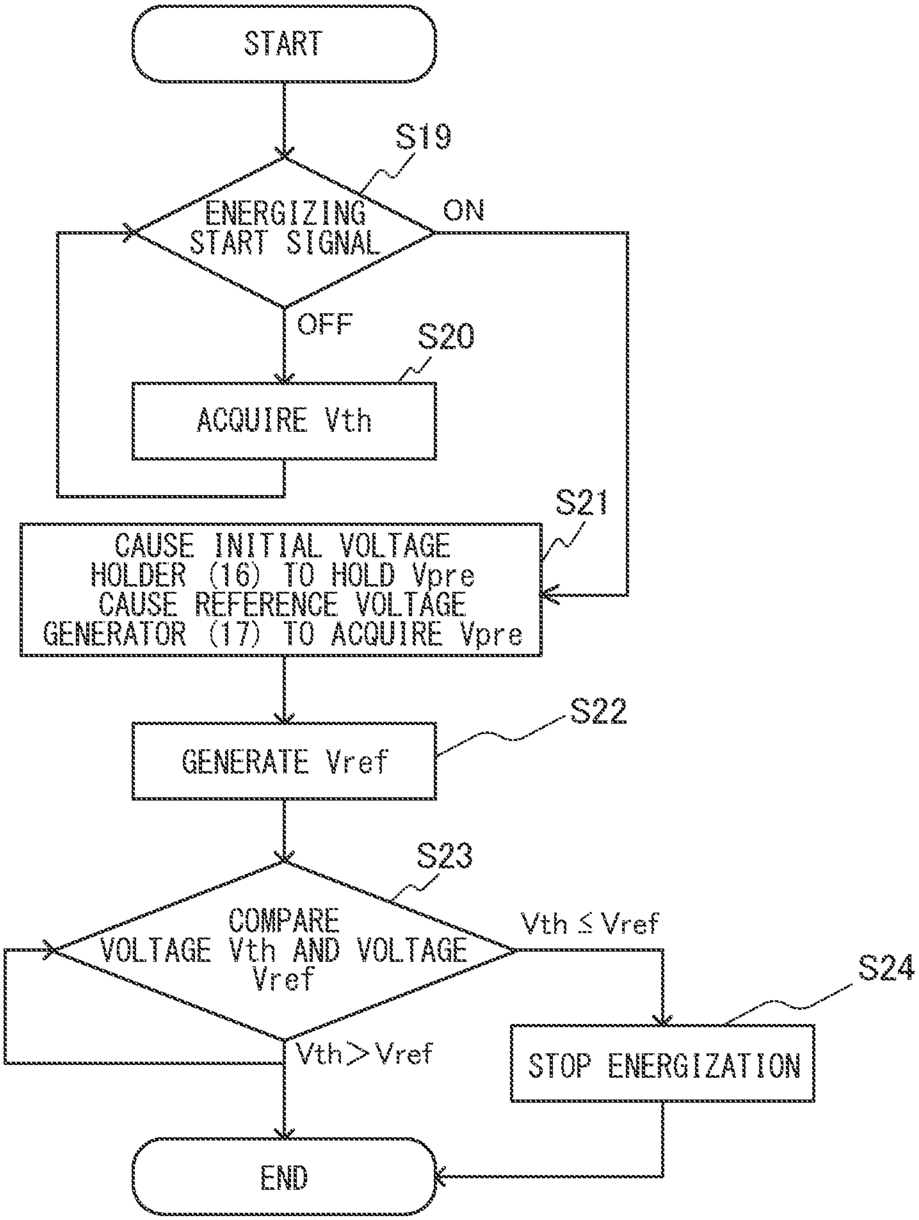
FIG. 4 is a flowchart of excessive-temperature-rise prevention control of the first embodiment.

Next, operations of an excessive-temperature-rise prevention circuit of the present embodiment will be described with reference to a block diagram of FIG. 3 and a flowchart of FIG. 4 that illustrates the operations of the excessive-temperature-rise prevention circuit. As illustrated in FIG. 3, for electrically controlling the fixing apparatus 1, the image forming apparatus of the present embodiment includes an electric circuit including a power source 12, a controller 11, an excessive-temperature-rise prevention circuit 14, and a breaker 13. The controller 11 includes a storage device, such as a ROM, that stores a program, and a CPU that reads the program from the storage device and executes the program. The excessive-temperature-rise prevention circuit 14 includes an energizing-signal generator 15, an initial voltage holder 16, a reference voltage generator 17, and a comparator 18.

When the image forming apparatus receives a print command, the controller 11 outputs a print start command. Then, the pressing roller 8 is driven and rotated by a motor (not illustrated), and the fixing film 3 is rotated by the rotation of the pressing roller 8. In addition, the power source 12 starts the energization of the heater 4, and the heater 4 generates heat. The temperature of the heater 4 is detected by the temperature detection element 6, and the detection signal that corresponds to the temperature of the heater 4 is outputted from the temperature detection element 6 to the controller 11. The controller 11 controls the energization of the heater 4 by sending an energization control signal to the power source 12 so that the heater 4 is maintained at a predetermined temperature (set temperature).

The energization control signal from the controller 11 is sent also to the energizing-signal generator 15. If an output signal (i.e., an energizing signal) from the energizing-signal generator 15 is received by the initial voltage holder 16, the output voltage from the temperature detection element 6 is held by the initial voltage holder 16. In addition, if the output signal from the energizing-signal generator 15 is received by the reference voltage generator 17, the voltage held by the initial voltage holder 16 is given to the reference voltage generator 17. The reference voltage generator 17 generates a reference voltage that changes with the elapsed time from an initial value that is the voltage given from the initial voltage holder 16. The output voltage from the temperature detection element 6 and the output voltage (reference voltage) from the reference voltage generator 17 are compared with each other by the comparator 18. If the output voltage from the temperature detection element 6 is closer to a high temperature side than the output voltage from the reference voltage generator 17 is, the comparator 18 outputs a control signal to the breaker 13. Upon receiving the control signal, the breaker 13 stops the energization of the heater 4 performed by the power source 12, regardless of the energization control signal sent from the controller 11.

Next, the conditions of operation will be further described with reference to the flowchart of FIG. 4. While the energizing signal is OFF (S19: OFF), the initial voltage holder 16 receives an output voltage Vth obtained before the start of printing operation, from the temperature detection element 6 at predetermined time intervals (S20). If the energizing signal is turned ON (S19: ON), the initial voltage holder 16 holds an output voltage Vth outputted from the temperature detection element 6 immediately before the printing operation, as an initial voltage Vpre, and the reference voltage generator 17 receives a voltage corresponding to the initial voltage Vpre (S21).

After that, the reference voltage generator 17 generates the reference voltage that changes with the elapsed time from an initial value that corresponds to the initial voltage Vpre (S22). The reference voltage Vref generated by the reference voltage generator 17 is a function of time in which the value changes with time. In the function of time, a first period (first period of time, or first time window) and a second period (second period of time, second time window) exist, and the value changes with time in the first period, and is a fixed value in the second period. The reference voltage generator 17 outputs the reference voltage Vref to the comparator 18. The comparator 18 compares the reference voltage Vref outputted from the reference voltage generator 17 and the output voltage Vth outputted from the temperature detection element 6 (S23). If the output voltage Vth from the temperature detection element 6 is closer to a high temperature side than the reference voltage Vref from the reference voltage generator 17 is, the breaker 13 stops the energization of the heater 4 performed by the power source 12 (S24). In the present embodiment, since the output voltage from the temperature detection element 6 decreases monotonously as the detected temperature increases, the relationship of Vth≤Vref is satisfied when the output voltage Vth is closer to a high temperature side than the reference voltage Vref is. In other words, with respect to the output voltage of the temperature detection element 6 and the reference voltage Vref, "high temperature side" refers to a side (i.e., lower side in FIGS. 2, 9A to 9C, and 10A to 10C) where an absolute value of the voltage is small, and "low temperature side" refers to a side (i.e., upper side in FIGS. 2, 9A to 9C, and 10A to 10C) where an absolute value of the voltage is large.

Main Circuits of Fixing Apparatus

Figure 5:
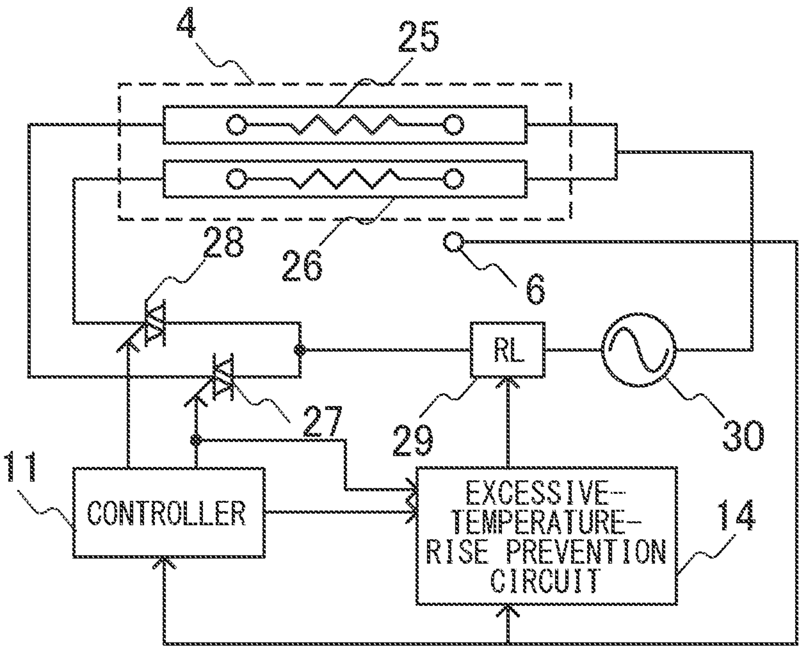
FIG. 5 is a circuit diagram for power control of the fixing apparatus of the first embodiment.

Next, the operation to stop the energization of the heater 4 will be described. In the present embodiment, when the power control of the heater 4 is performed, a main heater 25 and a sub-heater 26 included in the heater 4 are controlled independently. FIG. 5 is a diagram illustrating a connection between the heater 4 and a power control circuit.

As illustrated in FIG. 5, the heater 4 is included in a circuit that includes the controller 11, a first triac 27, a second triac 28, an AC power source 30 that serves as the power source 12 (FIG. 3), a relay 29 that serves as the breaker 13 (FIG. 3), and the excessive-temperature-rise prevention circuit 14. The first triac 27 and the main heater 25 are connected in series with each other, and the second triac 28 and the sub-heater 26 are connected in series with each other. In addition, a partial circuit that includes the first triac 27 and the main heater 25 and a partial circuit that includes the second triac 28 and the sub-heater 26 are connected in parallel with each other, and are connected with the AC power source 30.

The two triacs 27 and 28 are turned on and off by the gate control signals from the controller 11 being turned on and off. The relay 29 is interposed between the triacs, 27 and 28, and the AC power source 30; and the energization of the main heater 25 and the sub-heater 26 can be stopped by driving the relay 29. The relay 29 is connected to the below-described excessive-temperature-rise prevention circuit 14, and is driven by a control signal from the excessive-temperature-rise prevention circuit 14. The excessive-temperature-rise prevention circuit 14 is controlled by a control signal from the controller 11.

Description of Excessive-Temperature-Rise Prevention Circuit

Figure 6:
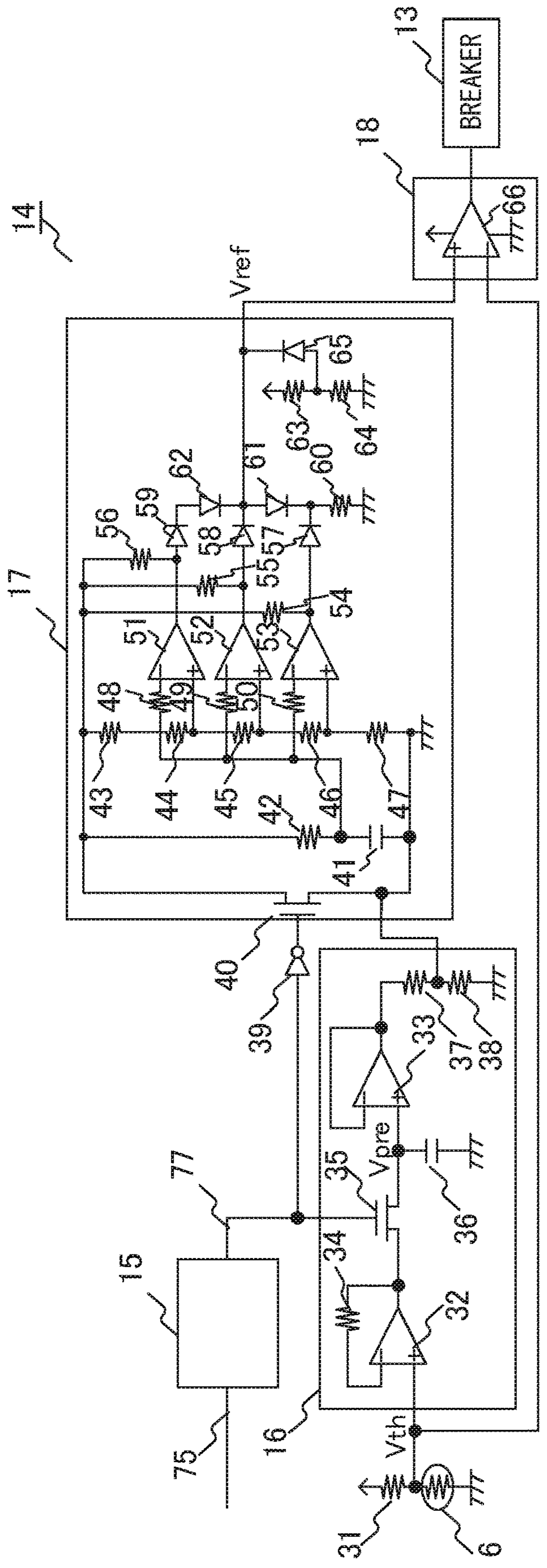
FIG. 6 is a circuit diagram of an excessive-temperature-rise prevention circuit of the first embodiment.

Next, the circuits of the excessive-temperature-rise prevention circuit 14 of the first embodiment will be described with reference to the circuit diagrams of FIGS. 6 and 7 and the timing charts of FIGS. 8 and 9. As illustrated in FIG. 6, the temperature detection element 6 is connected to a pull-up resistor 31, and outputs the output voltage Vth to the initial voltage holder 16 and the comparator 18. The energizing-signal generator 15 outputs an energizing signal 77 to the initial voltage holder 16 and the reference voltage generator 17, depending on a gate signal 75 sent from the controller 11 to the triac 27.

Figure 7:
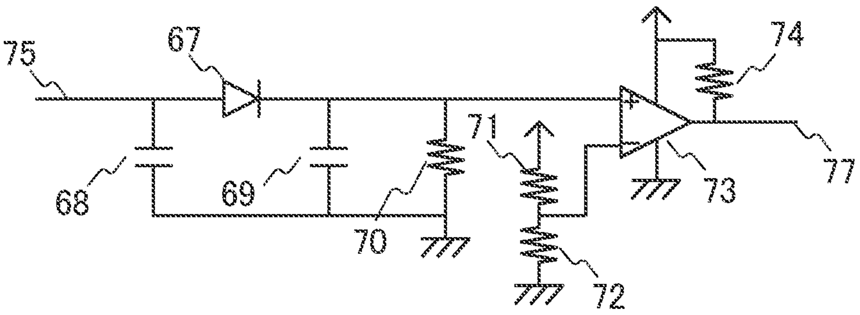
FIG. 7 is a circuit diagram of an energizing-signal generator of the first embodiment.
Figure 8:
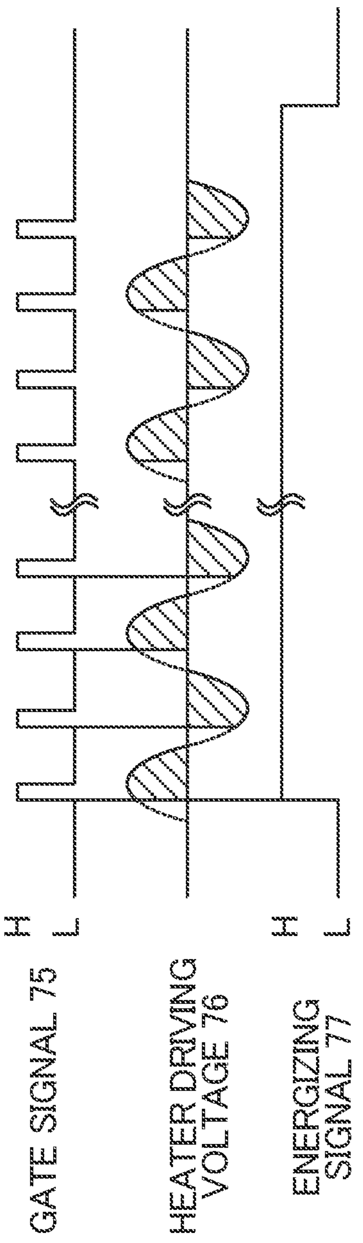
FIG. 8 is a timing chart of an energizing signal of the first embodiment.

As illustrated in FIG. 7, the energizing-signal generator 15 includes a circuit (i.e., a sample-and-hold circuit) including a capacitor 68, a diode 67, a capacitor 69, and a resistor 70; and outputs the energizing signal 77 having a high level (H) while the gate signal 75 is being outputted from the controller 11. The energizing signal 77 has a high level (H) in an ON state. The energizing-signal generator 15 also includes a circuit including resistors 71, 72, and 74, and a comparator 73. If the circuit is not disposed, the output signal from the sample-and-hold circuit lowers gently when the gate signal 75 is stopped. However, the circuit causes the output signal from the sample-and-hold circuit to fall instantly when the gate signal 75 is stopped. Thus, as illustrated in FIG. 8, while the controller 11 is outputting the gate signal 75, the energizing-signal generator 15 outputs the energizing signal 77 having a high level (H). The energizing signal 77 has a high level (H) in an ON state. Note that while the gate signal 75 is outputted from the controller 11 to the triac 27, a driving voltage 76 illustrated in FIG. 8 is applied to the main heater 25.

As illustrated in FIG. 6, the initial voltage holder 16 includes a buffer including a resistor 34 and an operational amplifier 32, and the buffer receives the output voltage Vth from the temperature detection element 6. When the energizing signal 77 has a low level (L), an FET switch 35 is shortened and the output voltage Vth from the temperature detection element 6 is charged in a capacitor 36. The energizing signal 77 has a low level (L) in an OFF state. The voltage across the capacitor 36 is received by a buffer that includes an operational amplifier 33, and is adjusted into a predetermined voltage by resistors 37 and 38. The adjusted voltage is outputted to the reference voltage generator 17.

The output signal from the energizing-signal generator 15 is sent also to an FET switch 40 of the reference voltage generator 17 via an inverter 39. When the output signal from the energizing-signal generator 15 has a high level (H), the FET switch 40 is shortened and the adjusted voltage is supplied to the reference voltage generator 17. The output signal from the energizing-signal generator 15 has a high level (H) in an ON state. The inverter 39 may be constituted by a transistor, an FET, or another element.

The reference voltage generator 17 is a circuit including a triangular-waveform voltage generator (41 and 42), a divided-voltage generator (43 to 47), a stepped-waveform generator that includes a plurality of comparators, and a voltage clamp (63 to 65). The triangular-waveform voltage generator includes a resistor 42 and a capacitor 41, and outputs a triangular-waveform voltage. The divided-voltage generator includes resistors 43 to 47. The divided-voltage generator divides the voltage given from the initial voltage holder 16 by using the resistors 43 to 47 connected in series with each other, and outputs divided voltages (i.e., divided output signals). The stepped-waveform generator includes three comparators. The three comparators are constituted by comparators 51 to 53, resistors 54 to 56 and 60, and diodes 57 to 59, 61, and 62. Upon receiving an output voltage from the triangular-waveform voltage generator and output voltages from the divided-voltage generator, the stepped-waveform generator generates a stepped-waveform voltage that changes in accordance with the time having elapsed since the start of supply of electricity to the energizing-signal generator 15. The stepped-waveform voltage generated is limited by the voltage clamp, which includes the resistors 63 and 64 and the diode 65, so as not to be equal to or lower than a predetermined voltage Va; and is outputted as the reference voltage Vref.

The reference voltage generator 17 outputs the stepped-waveform voltage, which decreases in a step-by-step manner, as the reference voltage Vref until a predetermined time has elapsed since the start of supply of electricity to the energizing-signal generator 15. After the predetermined time has elapsed, the reference voltage generator 17 outputs a constant voltage Va as the reference voltage Vref. In other words, the reference voltage generator 17 outputs the reference voltage Vref whose waveform changes toward a high temperature side (i.e., a low voltage side), to the comparator 18 in a period of time (i.e., the first period in the time axis) in which the time having elapsed since the start of heating of the heater 4 (when the energizing signal 77 is turned ON) is equal to or shorter than the predetermined time. In addition, the reference voltage generator 17 outputs the reference voltage Vref that has a constant value (Va) regardless of the elapsed time, to the comparator 18 in a period of time (i.e., the second period in the time axis) in which the time having elapsed since the start of heating of the heater 4 (when the energizing signal 77 is turned ON) is longer than the predetermined time. The operation of the excessive-temperature-rise prevention circuit 14, which uses the above-described reference voltage Vref, will be described below.

The above-described predetermined time is a rise time of the heater temperature, or a period of time in which the heater temperature is monitored for checking whether a rapid temperature rise of the heater 4 has occurred after the start of heating of the heater 4. As one example, the predetermined time is a period of time from when the energization of the heater having a room temperature (25° C.) is started, until the heater temperature reaches a temperature (e.g., 130° C.) near a set temperature. In the present embodiment, the predetermined time is set at 3 seconds.

In a period of time after the predetermined time has elapsed since the start of heating of the heater 4, the heater temperature is normally kept at a temperature near the set temperature (i.e., a temperature into which the heater temperature is controlled). However, in the period of time after the predetermined time has elapsed since the start of heating of the heater 4, the energization of the heater 4 might be continued even though the heater temperature exceeds the set temperature (e.g., 150° C.), due to an error of the temperature control of the heater performed by the controller 11. The predetermined voltage Va is a threshold value to determine the abnormal heating state. In the present embodiment, the voltage Va is set at 0.67 V that corresponds to a detected temperature of 200° C. (see FIG. 2). In other words, in the present embodiment, the heater temperature range equal to or higher than 200° C. is an abnormal-heating range.

The above-described predetermined time, the voltage Va, the number of steps of the stepped waveform, the height of each step of the stepped waveform, and the like can be modified in accordance with a specific configuration of the fixing apparatus. For example, if the temperature detection element 6 has characteristics different from those illustrated in FIG. 2, the voltage Va may have a value different from 0.67 V.

The comparator 18 is constituted by a comparator 66. The comparator 18 compares the output voltage Vth from the temperature detection element 6 and the reference voltage Vref, and outputs a signal that turns off the breaker 13 (i.e., relay 29) if the output voltage Vth is closer to a high temperature side than the reference voltage Vref is, that is, if the relationship of Vth≤Vref is satisfied. In the present embodiment, since the relay 29 (FIG. 5) is used as the breaker 13, the energization of the heater 4 can be stopped via the relay 29. The relay 29 is a latching relay. Thus, once the relay 29 is turned off, the relay 29 latches an OFF state.

Description of Operation of Excessive-Temperature-Rise Prevention Circuit

Figure 9A:
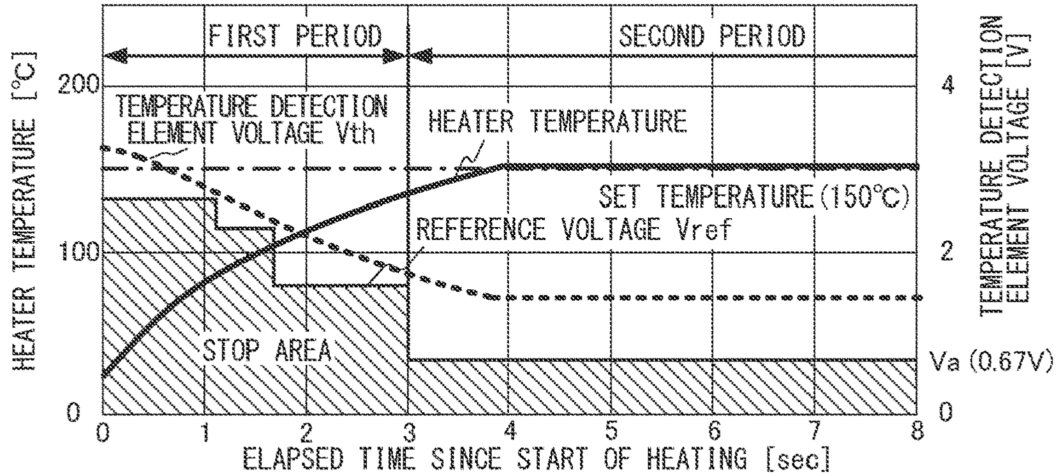
FIG. 9A is a timing chart illustrating an example of operation of the fixing apparatus of the first embodiment.

Next, operations of the present embodiment will be described with reference to timing charts of FIGS. 9A to 9C and 10A to 10C. Each of FIGS. 9A to 9C and 10A to 10C illustrates the temperature of the heater 4, the output voltage Vth from the temperature detection element 6, and the reference voltage Vref from the reference voltage generator 17, which are obtained after the start of heating. As described with reference to the circuit diagram of FIG. 6, the reference voltage Vref outputted from the reference voltage generator 17 is a stepped-waveform voltage that decreases with the elapsed time in a step-by-step manner. The initial value of the reference voltage Vref is a voltage given from the initial voltage holder 16 to the reference voltage generator 17 immediately before the start of printing operation. In FIG. 9A, the set temperature that is a target temperature (150° C.) of the heater 4 is indicated by a thin alternate long and short dashed line. In FIGS. 9A to 9C and 10A to 10C, the temperature of the heater 4 obtained before the energization of the heater 4 is stopped is indicated by a solid line, and the temperature of the heater 4 after the energization of the heater 4 is stopped represents the temperature of the heater 4 obtained in a case where the energization of the heater 4 is not stopped, and is indicated by an alternate long and short dashed line.

If the output voltage Vth from the temperature detection element 6 is closer to a high temperature side than the reference voltage Vref (that has a stepped waveform) is, the excessive-temperature-rise prevention circuit 14 causes the breaker 13 to stop the energization of the heater 4. In the present embodiment, the output voltage from the temperature detection element 6 decreases (i.e., decreases monotonously) as the detected temperature increases (see FIG. 2). Thus, when the output voltage Vth is closer to a high temperature side than the reference voltage Vref is, the relationship of Vth≤Vref is satisfied. That is, if the relationship of Vth≤Vref is satisfied, the excessive-temperature-rise prevention circuit 14 of the present embodiment determines that the temperature of the heater 4 will enter the abnormal-heating range, and stops the energization of the heater 4. As described above, a period of time in which the reference voltage Vref decreases, in a step-by-step manner, from a voltage obtained when the heating of the heater 4 is started (that is, when the energizing signal 77 is turned on) is defined as the first period, and a period of time in which the reference voltage Vref has a constant value (Vref=Va) is defined as the second period. A point of time between the first period and the second period is a point of time at which the predetermined time of 3 seconds has elapsed since the start of heating of the heater 4. At or after the point of time, the reference voltage Vref decreases from a voltage higher than the voltage Va to the voltage Va.

In a normal print mode (normal operation) illustrated in FIG. 9A, the temperature of the heater 4 increases toward a target temperature of 150° C., and is kept at about 150° C. after a certain time. Thus, while the temperature of the heater 4 increases, the output voltage Vth from the temperature detection element 6 decreases accordingly; while the temperature of the heater 4 is kept at a constant temperature of about 150° C., the output voltage Vth from the temperature detection element 6 is also kept at a substantially constant voltage corresponding to the temperature of 150° C. In this case, since the output voltage Vth from the temperature detection element 6 is always higher than the reference voltage Vref (Vth>Vref), the excessive-temperature-rise prevention circuit 14 does not stop the energization of the heater 4.

Figure 9B:
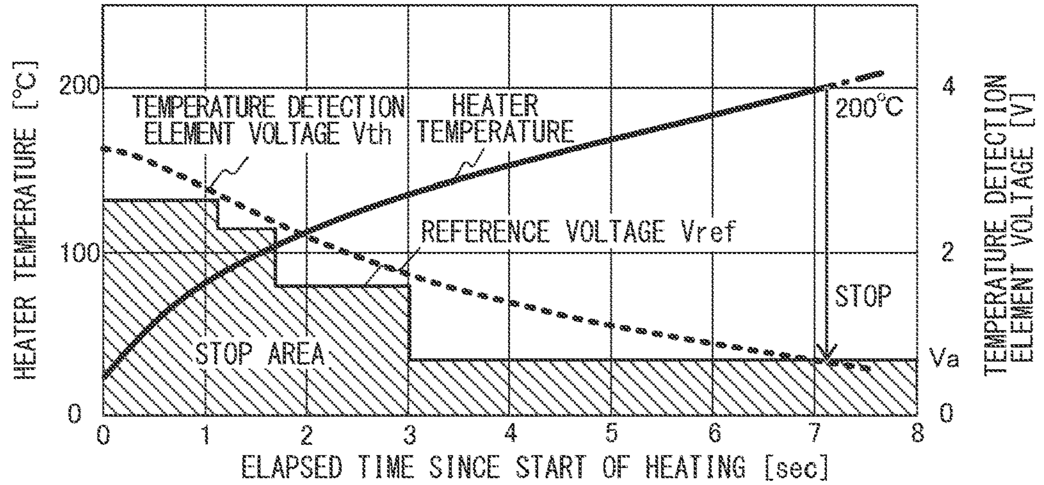
FIG. 9B is a timing chart illustrating an example of operation of the fixing apparatus of the first embodiment.

FIG. 9B illustrates an abnormal operation in which the temperature of the heater 4 continues to rise without becoming constant at a target temperature of 150° C., because an error (i.e., failure in temperature adjustment) occurred in the energization control of the heater 4 performed by the controller 11. In this case, the output voltage Vth from the temperature detection element 6 continues to decrease in accordance with the continuous increase of the temperature of the heater 4, and becomes lower than a voltage corresponding to 150° C. In this case, since the output voltage Vth from the temperature detection element 6 becomes equal to or lower than the reference voltage Vref (that is equal to the voltage Va) in the second period, the excessive-temperature-rise prevention circuit 14 stops the energization of the heater 4.

Specifically, in the second period, the reference voltage Vref (that is equal to the voltage Va) has a value corresponding to a temperature of 200° C. of the heater 4. Thus, in the example illustrated in FIG. 9B, when the temperature of the heater 4 rises and reaches 200° C., the energization of the heater 4 is stopped.

Figure 9C:
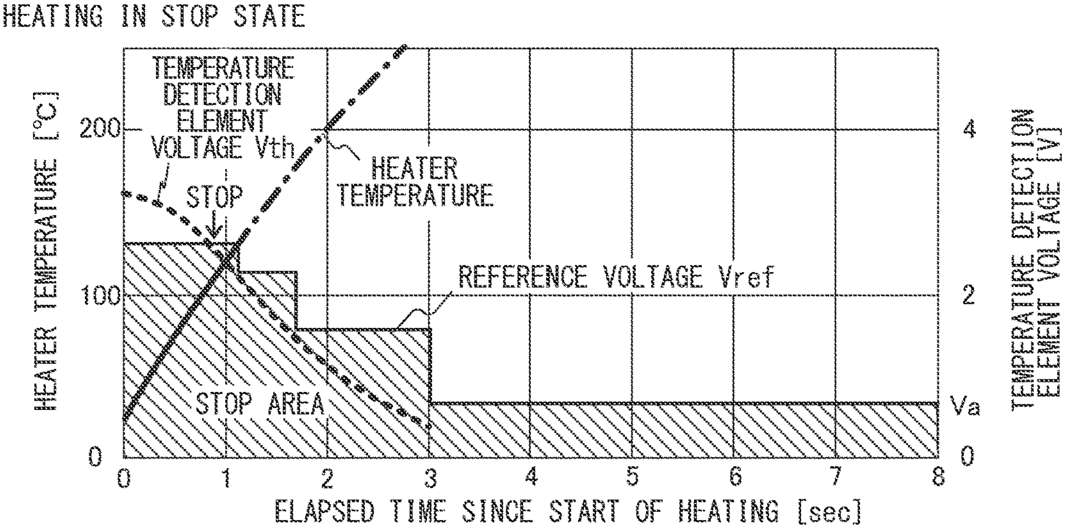
FIG. 9C is a timing chart illustrating an example of operation of the fixing apparatus of the first embodiment.

FIG. 9C illustrates an abnormal operation in which the heater 4 is energized in a state where the rotation of the fixing film 3 and the pressing roller 8 is stopped. In this case, since the fixing film 3 and the pressing roller 8 are not rotating, the heat generated from the heater 4 does not move out of the fixing nip N. As a result, the temperature of the heater 4 rises rapidly. In this case, since the output voltage Vth from the temperature detection element 6 decreases rapidly as indicated by a broken line, the output voltage Vth from the temperature detection element 6 becomes equal to or lower than the reference voltage Vref (Vth≤Vref) in the first period. As a result, the excessive-temperature-rise prevention circuit 14 stops the energization of the heater 4.

Thus, in the present embodiment, the reference voltage Vref generated by the reference voltage generator 17 changes with the time having elapsed since the start of heating of the heater 4, from a low temperature side toward a high temperature side. In other words, in the present embodiment, the reference voltage generator 17 changes the reference voltage in accordance with the time having elapsed since the start of heating of the heater 4, such that a temperature corresponding to the reference voltage obtained when a first time has elapsed is lower than a temperature corresponding to the reference voltage obtained when a second time longer than the first time has elapsed. The first time is a time having elapsed since the supply of electric power to the heating portion was started by the controller, and the second time is a time having elapsed since the supply of electric power to the heating portion was started by the controller. In the present embodiment, the first time may be 0 seconds from the start of heating of the heater 4 (the reference voltage Vref has an initial value at the first time), and the second time may be 1.5 seconds from the start of heating of the heater 4 (the reference voltage Vref has a value at the second time, decreased by a voltage that corresponds to one step). In the present embodiment, as a specific example of waveforms in which the reference voltage at the first time is different from the reference voltage at the second time, a stepped waveform is used. In the stepped waveform, the reference voltage Vref changes with the elapsed time in a step-by-step manner toward a high temperature side (i.e., a low voltage side).

By the way, if the temperature of the heater 4 rises rapidly after the start of heating of the heater 4, the heater 4 might be heated in a state where the rotation of the fixing film 3 and the pressing roller 8 is stopped for some error. Note that the rapid temperature rise means that the temperature rise speed is significantly higher than a temperature rise speed estimated from the amount of heat generation of the heater 4 and the thermal capacity of the fixing film 3, the heater holding member 2, the pressing roller 8, and the like.

In the present embodiment, the reference voltage Vref changes with the time having elapsed since the start of heating of the heater 4, from a low temperature side toward a high temperature side. Thus, if the temperature of the heater 4 rises rapidly immediately after the start of heating of the heater 4, the output voltage Vth from the temperature detection element 6 enters a stop area (FIG. 9C) that is on a high temperature side with respect to the reference voltage Vref, even when the heater 4 has a relatively low temperature. As a result, the energization of the heater 4 is stopped. Therefore, if an error occurs and the temperature of the fixing film 3 rises rapidly, the energization of the heating portion can be quickly stopped. In addition, since the reference voltage Vref is not constant but changes from a low temperature side toward a high temperature side, it is not prevented that the temperature of the heater rises at a normal temperature-rise speed in the first period.

In addition, in the waveform used in the present embodiment, the reference voltage Vref changes with the elapsed time toward a high temperature side in the first period after the start of heating of the heater 4; and has a constant value (Va) in the second period, regardless of the elapsed time. Thus, both when an error occurs and the temperature of the fixing film 3 rises rapidly, and when an error occurs and the temperature of the fixing film 3 rises gently, the energization of the heater 4 can be stopped at appropriate timing before the temperature of the fixing film 3 reaches the abnormal-heating range.

In FIGS. 9A to 9C described above as examples, the temperature of the fixing apparatus 1 at the start of printing operation is a room temperature. However, the fixing apparatus 1 may have a high temperature at the start of printing operation, as in a case where a printing operation is started immediately after the previous printing operation is completed. Hereinafter, operations performed in such a case will be described with reference to FIGS. 10A to 10C.

Figure 10A:
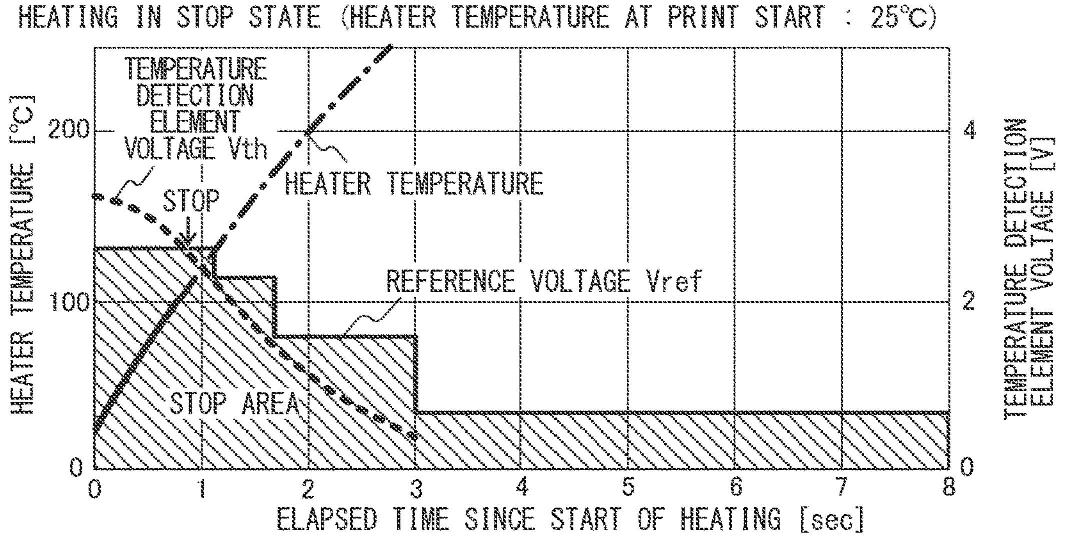
FIG. 10A is a timing chart illustrating an example of operation of the fixing apparatus of the first embodiment.
Figure 10B:
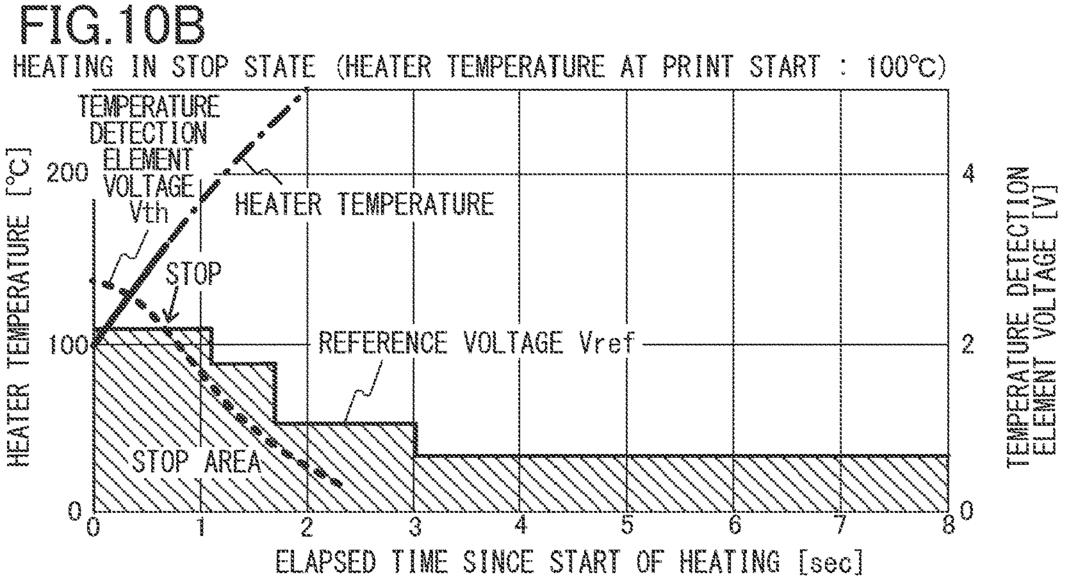
FIG. 10B is a timing chart illustrating an example of operation of the fixing apparatus of the first embodiment.

FIG. 10A illustrates the same case as that illustrated in FIG. 9C, for comparison. That is, FIG. 10A illustrates an abnormal operation in which the heater 4 is energized in a state where the rotation of the fixing film 3 and the pressing roller 8 is stopped, and in which the heater 4 has a room temperature (25° C.) at the start of printing operation. FIG. 10B illustrates an abnormal operation in which the heater 4 is energized in a state where the rotation of the fixing film 3 and the pressing roller 8 is stopped, and in which the heater 4 has a high temperature (100° C.) at the start of printing operation.

As described above, the output voltage from the temperature detection element 6 that corresponds to a temperature of the heater 4 obtained before the start of printing operation is held, as the initial voltage Vpre, by the initial voltage holder 16; and an initial value of the reference voltage Vref that corresponds to the initial voltage Vpre is given to the reference voltage generator 17. Thus, if the heater 4 has a high temperature at the start of printing operation, the voltage given from the initial voltage holder 16 to the reference voltage generator 17 becomes lower than a voltage given to the reference voltage generator 17 when the heater 4 has a room temperature at the start of printing operation. As a result, the initial value of the reference voltage Vref (i.e., a voltage at 0 seconds) illustrated in FIG. 10B becomes lower than the initial value of the reference voltage Vref illustrated in FIG. 10A.

Thus, even if the temperature of the heater 4 rises rapidly in a case where the fixing film 3 has a high temperature at the start of printing operation, the energization of the heater 4 can be stopped before the temperature of the heater 4 enters the abnormal-heating range. Note that although the reference voltage Vref in the first period decreases as the temperature of the heater 4 at the start of printing operation increases, the reference voltage Vref in the second period (i.e., the voltage Va) is constant regardless of the temperature of the heater 4 obtained at the start of printing operation. Thus, the operation performed when the output voltage Vth from the temperature detection element 6 enters the stop area in the second period in a case where the heater 4 has a high temperature at the start of printing operation is the same as that described with reference to FIG. 9B.

Figure 10C:
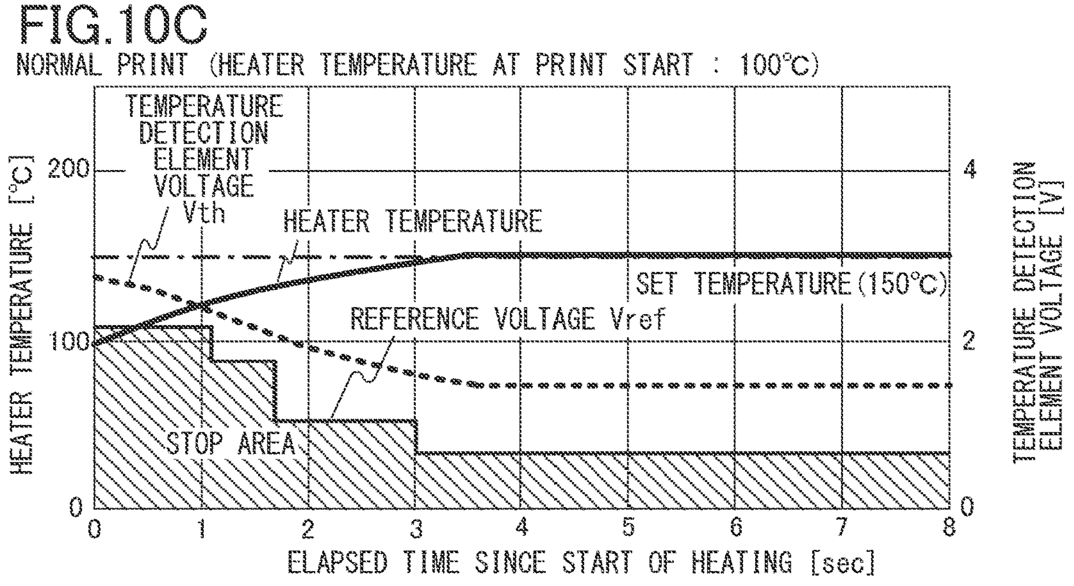
FIG. 10C is a timing chart illustrating an example of operation of the fixing apparatus of the first embodiment.

FIG. 10C illustrates a normal printing operation in which the heater 4 has a high temperature (100° C.) at the start of printing operation. In this case, while the initial value of the reference voltage Vref is lower than the initial value of the reference voltage Vref illustrated in FIG. 10A, in which the heater 4 has a room temperature (25° C.) at the start of printing operation, the temperature of the heater 4 does not rapidly rise because the fixing film 3 and the pressing roller 8 are normally rotated. Thus, the output voltage Vth from the temperature detection element 6 decreases gradually in accordance with the increase of the temperature of the heater 4, and after the temperature of the heater 4 reaches a target temperature of 150° C., the voltage Vth is kept at a substantially constant value. Thus, even if the heater 4 has a high temperature at the start of printing operation, the output voltage Vth from the temperature detection element 6 does not become equal to or lower than the reference voltage Vref if the printing operation is performed normally. In this case, the energization of the heater 4 is not stopped.

If the waveform of the reference voltage Vref is fixed in the first period regardless of the temperature of the heater 4 obtained at the start of printing operation, the excessive-temperature-rise prevention circuit 14 may not operate properly in a case where the heater 4 has a certain temperature in the start of printing operation. Specifically, if the waveform of the reference voltage Vref is fixed in the first period, to the waveform illustrated in FIG. 10A, and the heater 4 has a high temperature at the start of printing operation, the relationship of Vth≤Vref may be satisfied although the printing operation is performed normally. In this case, the energization of the heater 4 will be stopped. On the other hand, if the waveform of the reference voltage Vref is fixed in the first period, to the waveform illustrated in FIG. 10B, and the heater 4 has a room temperature at the start of printing operation, the timing at which the voltage Vth becomes equal to or lower than the reference voltage Vref (Vth≤Vref) at a rapid temperature rise of the heater 4 is delayed from the timing of the present embodiment. As a result, the timing at which the energization of the heater 4 is stopped will be delayed from the timing of the present embodiment, and the temperature rise of the heater 4 may continue in the delay time.

In other words, in a case where a first temperature (e.g., 100° C.) corresponds to an output voltage (Vpre) from the temperature detection element 6 obtained at the start of heating, and a second temperature (e.g., 25° C.) lower than the first temperature corresponds to an output voltage (Vpre) from the temperature detection element 6 obtained at the start of heating, the reference voltage Vref corresponding to the first temperature shifts from the reference voltage Vref corresponding to the second temperature, toward a high temperature side. That is, if the heater 4 has a high temperature at the start of heating, the reference voltage Vref is shifted such that the allowable temperature range of the heater 4, in which the heater 4 is heated normally after the start of heating, is expanded toward a high temperature side.

Thus, in the present embodiment, the initial value of the reference voltage Vref is changed in accordance with the temperature of the heater 4 obtained at the start of printing operation. In this manner, it is possible to quickly stop the energization of the heater 4 in accordance with the temperature of the heater 4 obtained at the start of printing operation if a rapid temperature rise of the heater 4 is detected, while allowing the normal temperature rise of the heater 4.

Since the circuits used for the description are examples, other circuits may be used as long as the other circuits have the same functions.

Second Embodiment

A second embodiment differs from the first embodiment in that a fixing apparatus having an induction heating system is used as the fixing apparatus 1, and that the reference voltage generator 17 has a different circuit configuration. Hereinafter, features different from those of the first embodiment will be mainly described.

Configuration of Fixing Apparatus

Figure 11:
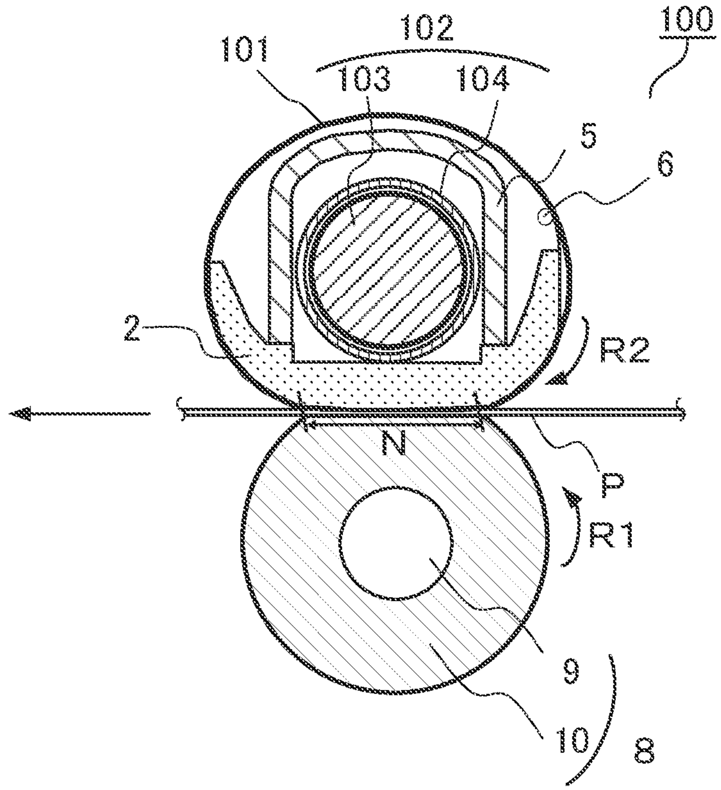
FIG. 11 is a schematic diagram of a fixing apparatus of a second embodiment.

FIG. 11 is a cross-sectional view of a fixing apparatus 100 of the present embodiment. The fixing apparatus 100 includes a fixing film 101, an induction heating member 102, a heater holding member 2, a pressing roller 8, and a metal stay 5. The pressing roller 8 serves as a facing member that faces the heater holding member 2 via the fixing film 101.

The fixing film 101 is a hollow-cylinder-shaped rotary member including a conductive layer, and is constituted by a flexible film member (i.e., an endless belt). The induction heating member 102 includes a magnetic core 103 and an exciting coil 104, and causes the fixing film 101 to generate heat through induction heating when the exciting coil 104 is applied with alternating voltage and energized. That is, when applied with alternating voltage, the exciting coil 104 generates an alternating magnetic field that surrounds the conductive layer of the fixing film 101. As a result, an eddy current flows in the conductive layer to cancel the change of the magnetic field, so that the fixing film 101 is heated by the Joule heat. The induction heating member 102 and the heater holding member 2 are disposed inside the fixing film 101. The pressing roller 8 is in pressure contact with the heater holding member 2 via the fixing film 101, and a fixing nip N is formed between the pressing roller 8 and the heater holding member 2. The heater holding member 2, which is disposed inside the fixing film 101, and the pressing roller 8 are a nip forming unit that forms the fixing nip N, as a nip portion.

The metal stay 5 is made of stainless steel or the like, which hardly generates heat through induction heating. The fixing film 101 is a multi-layered hollow-cylinder-shaped rotary member that includes a base layer, a heat generating layer, an elastic layer, and a release layer, and that has a diameter of 10 to 50 mm. The base layer is made of stainless steel. The heat generating layer is made of conductive material of pure metal or alloy. The pure metal may be aluminum (Al), nickel (Ni), copper (Cu), zinc (Zn), or the like. The elastic layer is laminated on the outer surface of the heat generating layer. The release layer is laminated on the outer surface of the elastic layer. The pressing roller 8 includes a core metal 9 made of a material, such as iron or aluminum, and an elastic layer 10 made of a material, such as a silicone rubber. The magnetic core 103, which is a core member of the induction heating member 102, has end portions and is made of a ferromagnetic material. The ferromagnetic material may be oxide or alloy that has high magnetic permeability. The oxide may be sintered ferrite or ferrite resin, and the alloy may be amorphous alloy or permalloy. The exciting coil 104 is a conductive wire wound spirally around the outer circumferential surface of the magnetic core 103 along the longitudinal direction. The induction heating member 102 is held by the heater holding member 2 made of heat-resistant resin. The heater holding member 2 also has a guide function to guide the rotation of the fixing film 101. The metal stay 5 receives pressure applying force (not illustrated), and urges the heater holding member 2 toward the pressing roller 8.

The pressing roller 8 receives power from a motor (not illustrated), and rotates in a direction indicated by an arrow R1. The fixing film 101 is rotated in a direction indicated by an arrow R2, by the rotation of the pressing roller 8. The fixing apparatus 100 fixes a toner image formed on a recording material P and still not fixed to the recording material P, to the recording material P by applying the heat of the fixing film 101, heated through induction heating, to the recording material P while nipping and conveying the recording material P in the fixing nip N. That is, the fixing film 101 is a fixing member of the present embodiment, and the induction heating member 102 is a heating portion of the present embodiment.

A temperature detection element 6 is one example of a temperature detector, and is in contact with the fixing film 101. For controlling the energization of the induction heating member 102, a CPU (not illustrated) controls the duty ratio, frequency, or output stop period of the alternating voltage applied to the induction heating member 102, in accordance with the output signal from the temperature detection element 6. With this control, the temperature in the fixing nip is kept at a predetermined fixing temperature. In addition, safety elements such as a thermo switch and a thermal fuse, are also disposed in the vicinity of the fixing film 101. The safety elements stop the energization of the induction heating member 102 if the fixing film 101 is abnormally heated. The temperature detection element 6 may be a thermistor, as in the first embodiment.

Figure 12:
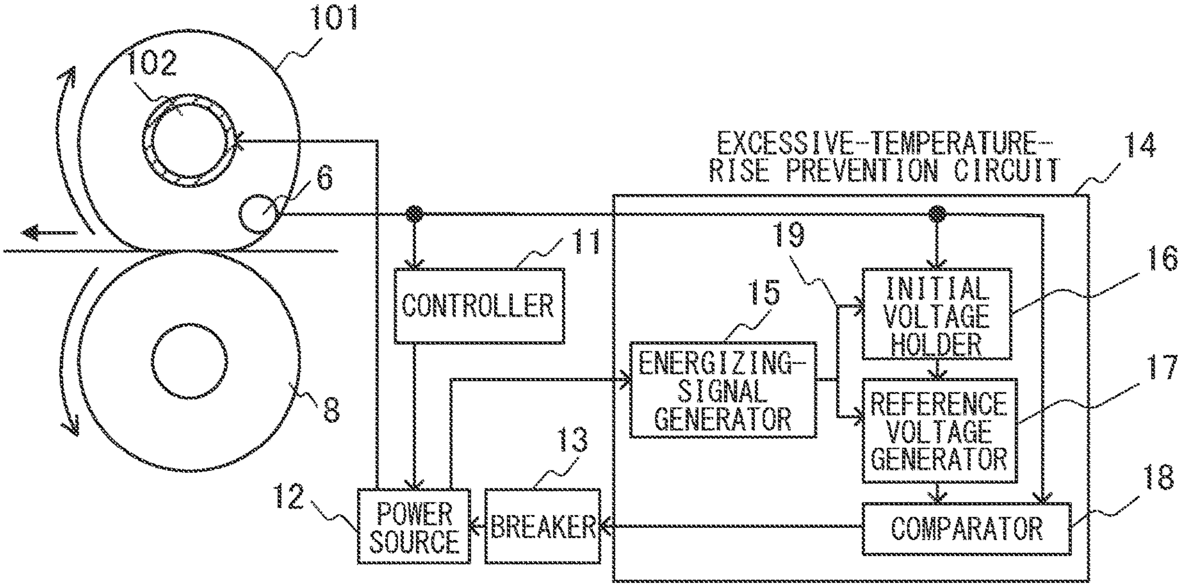
FIG. 12 is a block diagram illustrating a configuration of control of the fixing apparatus of the second embodiment.

The operation of the excessive-temperature-rise prevention circuit 14 illustrated in FIG. 12 is substantially the same as that of the first embodiment. However, the operation differs from that of the first embodiment in that the induction heating member 102 is energized by the power source 12, that the temperature detection element 6 is in contact with the inner surface of the fixing film 101, and that the energizing-signal generator 15 receives a signal from the power source 12. Since the stop operation performed on the power source 12 is the same as that of the first embodiment, the description thereof will be omitted.

Figure 13:
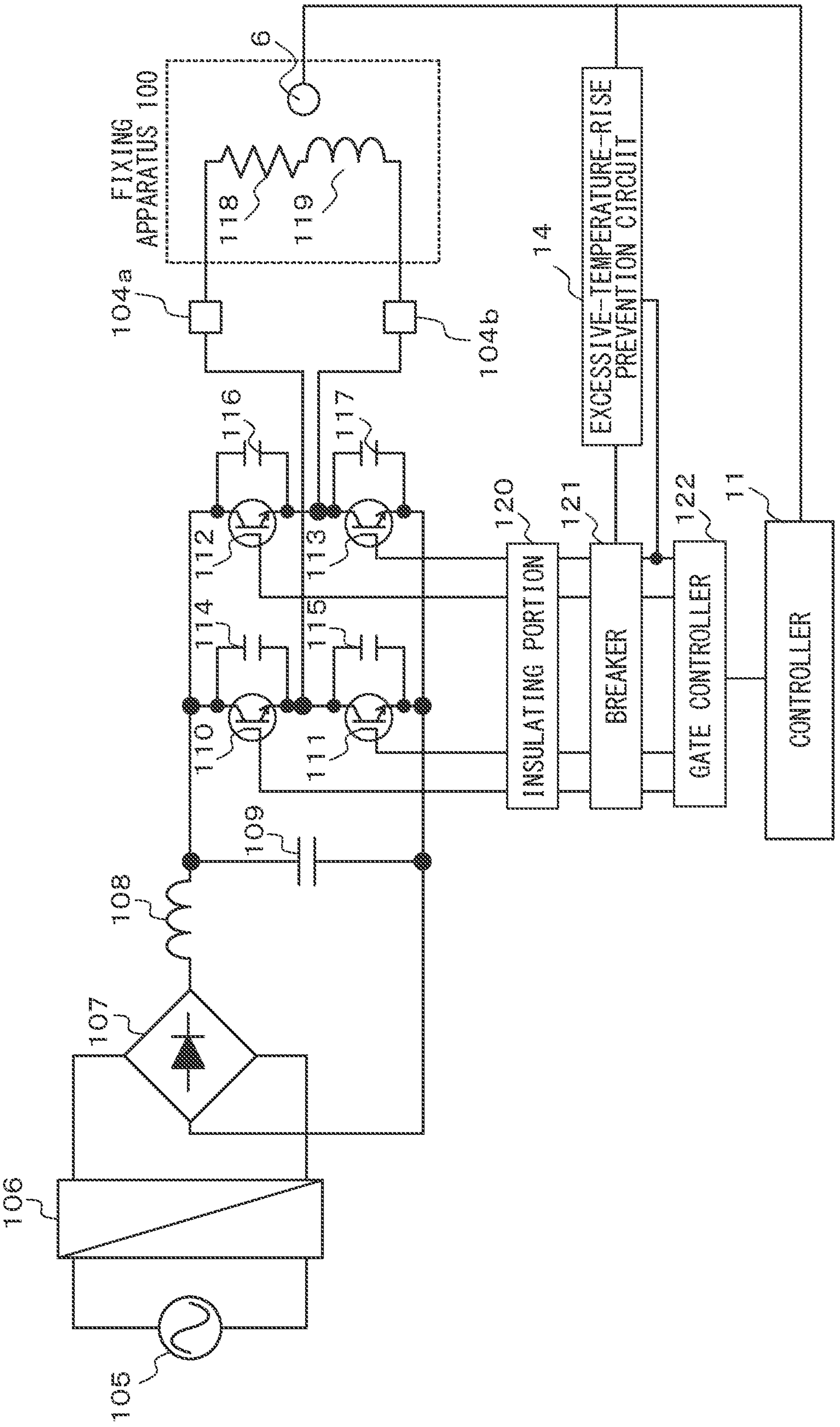
FIG. 13 is a circuit diagram for power control of the fixing apparatus of the second embodiment.

First, a circuit that starts and stops the energization of the induction heating member 102 will be described. FIG. 13 is a diagram illustrating a connection between the induction heating member 102 and a power control circuit. The power control circuit includes a controller 11, an AC power source 105, a line filter 106, a rectifier 107, a coil 108, and a capacitor 109. The coil 108 and the capacitor 109 constitutes a filter that smooths the output signal from the rectifier 107. The power control circuit also includes a full-bridge power source constituted by switching elements 110 to 113 and capacitors 114 to 117. The switching elements may be IGBTs or FETs. The outputs of the full-bridge power source are connected to terminals 104*a* and 104*b* of the exciting coil 104 of the induction heating member 102. A resistor 118 and a coil 119 constitute an equivalent circuit of the fixing apparatus 100 including the induction heating member 102 and viewed from the terminals 104*a* and 104*b* of the exciting coil 104. The power control circuit further includes a gate controller 122, a breaker 121, an insulating portion 120, and the temperature detection element 6.

Upon receiving a control signal from the controller 11, the gate controller 122 outputs gate control signals that drive the switching elements 110 to 113. The breaker 121 and the insulating portion 120 are disposed between the gate controller 122 and the switching elements 110 to 113. The breaker 121 stops the gate control signals if an error occurs. The insulating portion 120 electrically insulates the full-bridge power source from the control circuit including the controller 11. The breaker 121 stops the energization of the induction heating member 102 by stopping the gate control signals. The control signal received by the breaker 121 is sent from the later-described excessive-temperature-rise prevention circuit 14. The excessive-temperature-rise prevention circuit 14 is controlled by a gate control signal sent from the gate controller 122.

Description of Excessive-Temperature-Rise Prevention Circuit

Next, the circuits of the excessive-temperature-rise prevention circuit 14 of the present embodiment will be described with reference to the circuit diagrams of FIGS. 13 and 14 and the timing charts of FIGS. 15A to 15B and 16A to 16C. Note that since the temperature detection element 6, the initial voltage holder 16, the inverter 39, and the FET switch 40 are the same as those of the first embodiment, the description thereof will be omitted.

Figure 14:
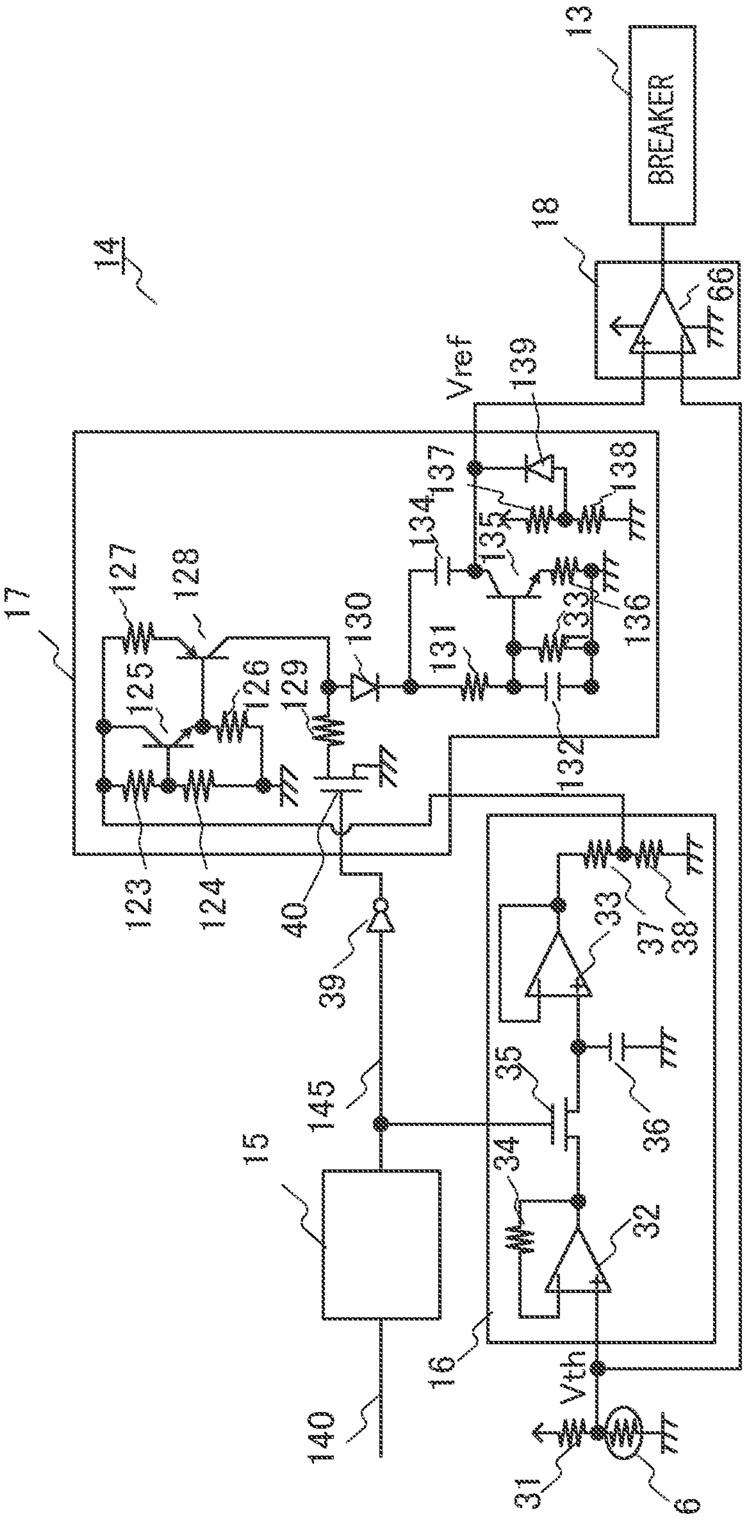
FIG. 14 is a circuit diagram of an excessive-temperature-rise prevention circuit of the second embodiment.
Figure 15A:
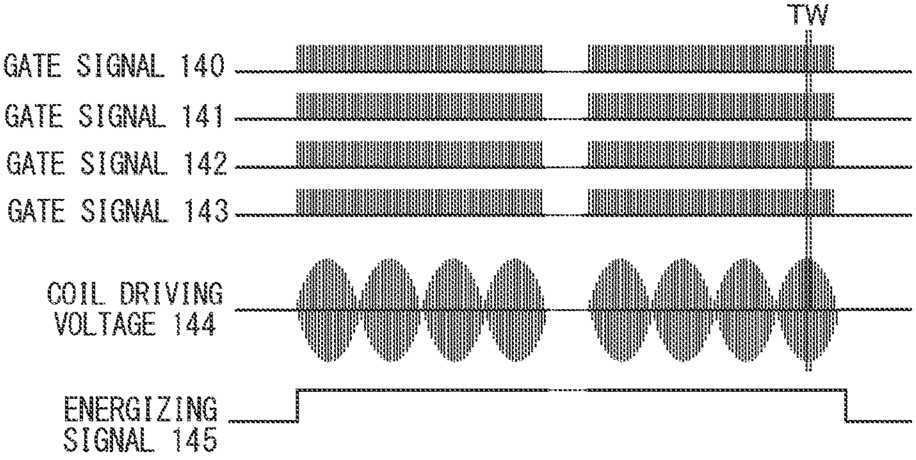
FIG. 15A is a timing chart of an energizing signal of the second embodiment.
Figure 15B:
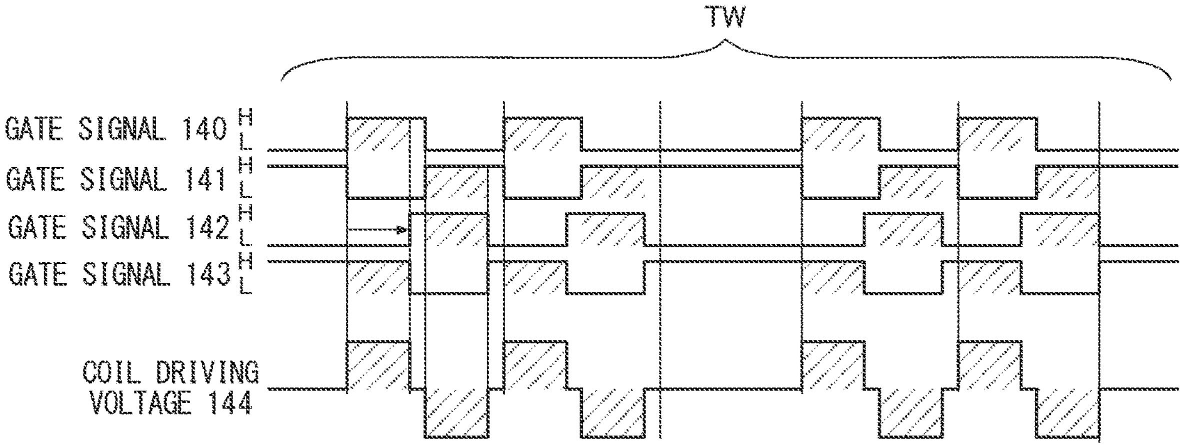
FIG. 15B is a timing chart of an energizing signal of the second embodiment.

An energizing-signal generator 15 illustrated in FIG. 14 is a sample-and-hold circuit that is the same as that illustrated in FIG. 7. The energizing-signal generator 15 outputs an energizing signal 145 having a high level (H) while at least one of four gate control signals 140 to 143 illustrated in FIG. 15A is being outputted from the gate controller 122. The energizing-signal generator 15 has a high level (H) in an ON state. The energizing-signal generator 15 includes a comparator including resistors 71, 72, and 74 and a comparator 73. If the comparator is not disposed, the signal outputted from the sample-and-hold circuit lowers gently. However, the comparator causes the signal outputted from the sample-and-hold circuit to fall instantly, to generate the energizing signal 145. Note that as illustrated in FIG. 15B, the waveform of the alternating voltage applied to the induction heating member 102 is produced by combining the gate control signals 140 to 143 with each other.

Figure 16A:
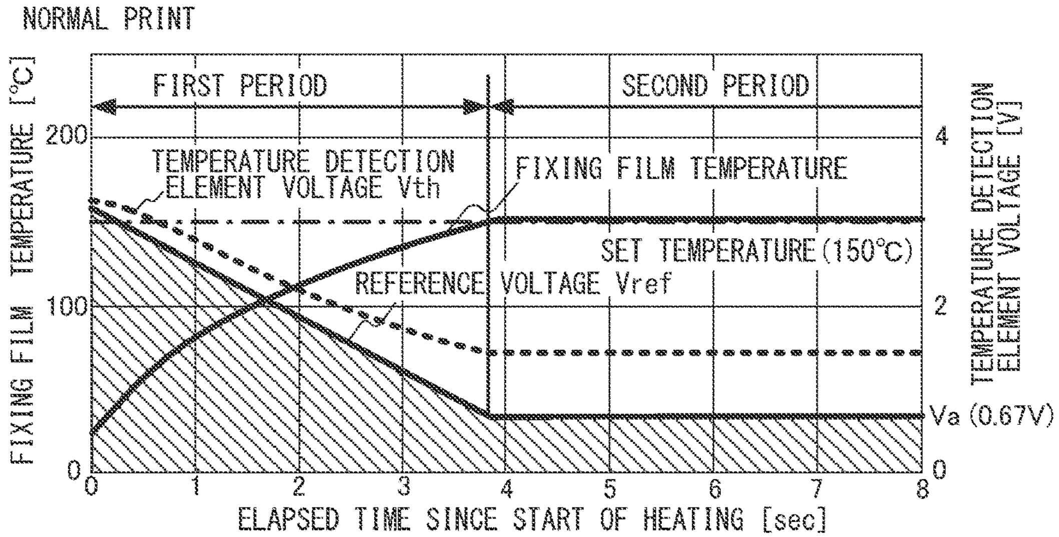
FIG. 16A is a timing chart illustrating an example of operation of the fixing apparatus of the second embodiment.
Figure 16B:
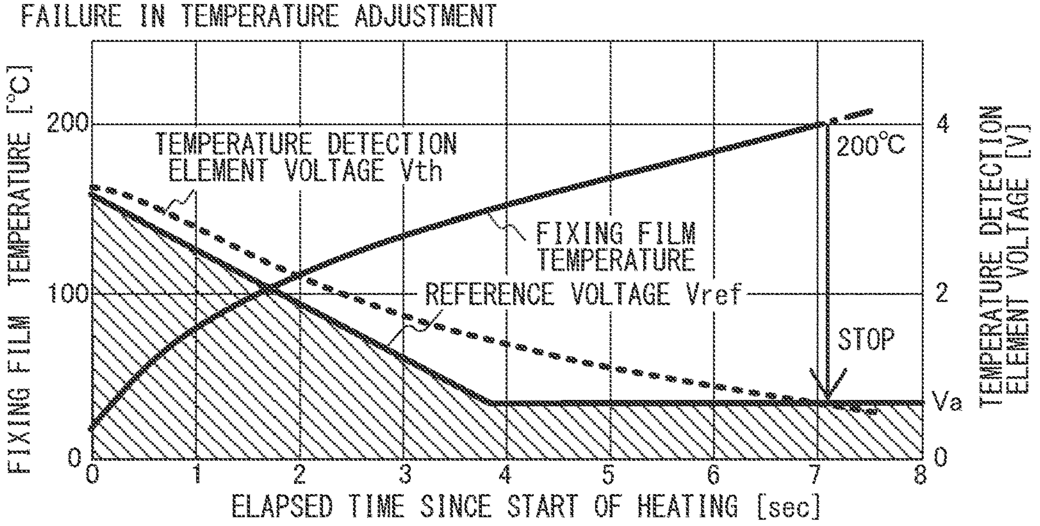
FIG. 16B is a timing chart illustrating an example of operation of the fixing apparatus of the second embodiment.
Figure 16C:
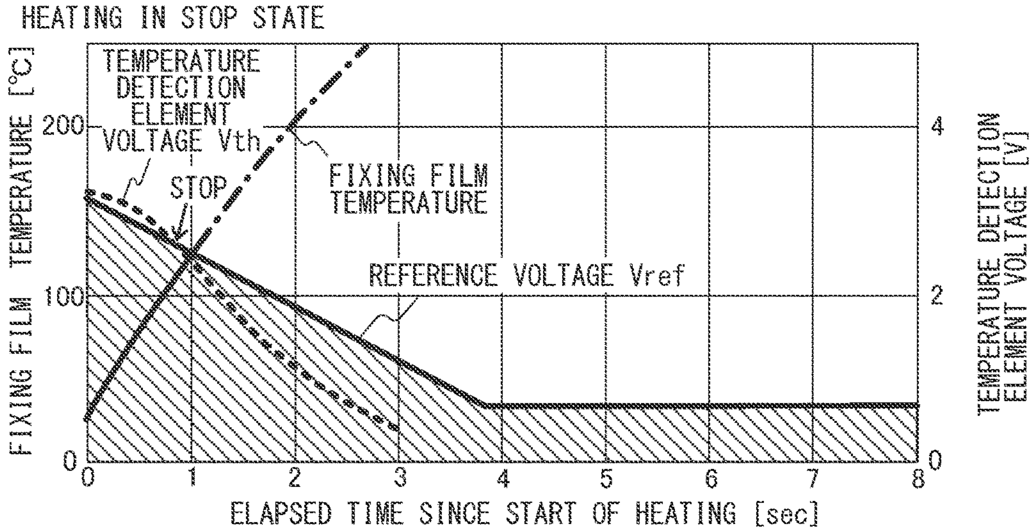
FIG. 16C is a timing chart illustrating an example of operation of the fixing apparatus of the second embodiment.

A reference voltage generator 17 illustrated in FIG. 14 includes a current source, a triangular-waveform voltage generator, and a voltage clamp. The current source includes resistors 123, 124, 126, and 127, and transistors 125 and 128; and supplies a constant current to the triangular-waveform voltage generator via a diode 130. The triangular-waveform voltage generator includes resistors 131, 133, and 136, capacitors 132 and 134, and a transistor 135; and produces a triangular-waveform voltage. The triangular-waveform voltage produced by the triangular-waveform voltage generator is limited by the voltage clamp, which includes resistors 137 and 138 and a diode 139, so as not to be equal to or lower than a predetermined voltage Va; and is outputted to a comparator 18. Thus, as illustrated in FIGS. 16A to 16C, the reference voltage Vref outputted by the reference voltage generator 17 has a triangular waveform that monotonously decreases in a period of time from when the heating was started until a predetermined time has elapsed, and that has a constant value (Va) after the predetermined time has elapsed.

The comparator 18 is constituted by a comparator 66. The comparator 18 compares the output voltage Vth from the temperature detection element 6 and the reference voltage Vref, and if the relationship of Vth≤Vref is satisfied, the comparator 18 outputs a signal that turns off the breaker 13.

Operation of Excessive-Temperature-Rise Prevention Circuit

Next, Operations of the Present Embodiment Will be Described with Reference to the timing charts of FIGS. 16A to 16C and 17A to 17C. Each of FIGS. 16A to 16C and 17A to 17C illustrates the temperature of the fixing film 101, the output voltage Vth from the temperature detection element 6, and the reference voltage Vref from the reference voltage generator 17, which are obtained after the start of heating. As described with reference to the circuit diagram, if the output voltage Vth from the temperature detection element 6 is closer to a high temperature side than the reference voltage Vref is (Vth≤Vref), the excessive-temperature-rise prevention circuit 14 determines that the temperature of the fixing film 101 will enter the abnormal-heating range, and stops the energization of the induction heating member 102. In the present embodiment, a period of time in which the reference voltage Vref has a triangular waveform and linearly decreases is defined as a first period, and a period of time in which the reference voltage Vref has a constant value (Va) is defined as a second period.

In a normal print mode (normal operation) illustrated in FIG. 16A, the temperature of the fixing film 101 rises toward a target temperature of 150° C., and is kept at about 150° C. after a certain time. After the certain time, the output voltage Vth from the temperature detection element 6 has a value corresponding to the temperature of 150° C. In this case, since the output voltage Vth from the temperature detection element 6 is always higher than the reference voltage Vref (Vth>Vref), the excessive-temperature-rise prevention circuit 14 does not stop the energization of the induction heating member 102.

FIG. 16B illustrates an abnormal operation in which the temperature of the fixing film 101 continues to rise without becoming constant at 150° C. because the controller 11 has failed to adjust the temperature. In this case, the output voltage Vth from the temperature detection element 6 that corresponds to the temperature of the fixing film 101 also does not become constant, and continues to decrease. In this case, the output voltage Vth from the temperature detection element 6 becomes equal to the reference voltage Vref (Vth=Vref) when the temperature of the fixing film 101 reaches 200° C. in the second period, and at this timing, the excessive-temperature-rise prevention circuit 14 stops the energization of the induction heating member 102.

FIG. 16C illustrates an abnormal operation in which the induction heating member 102 is energized in a state where the rotation of the fixing film 101 and the pressing roller 8 is stopped. In this case, since the heat generated from the fixing film 101 is not drawn to the pressing roller 8, the temperature of the fixing film 101 rises rapidly. In this case, since the output voltage Vth from the temperature detection element 6 decreases rapidly as indicated by a broken line, the output voltage Vth from the temperature detection element 6 becomes equal to or lower than the reference voltage Vref (Vth≤Vref) in the first period. As a result, the excessive-temperature-rise prevention circuit 14 stops the energization of the induction heating member 102.

Thus, also in the present embodiment, the reference voltage Vref generated by the reference voltage generator 17 changes with the time having elapsed since the start of heating, from a low temperature side toward a high temperature side. In other words, in the present embodiment, the reference voltage generator 17 changes the reference voltage in accordance with the time having elapsed since the start of heating, such that a temperature corresponding to the reference voltage obtained when a first time has elapsed is lower than a temperature corresponding to the reference voltage obtained when a second time longer than the first time has elapsed. The first time is a time having elapsed since the supply of electric power to the heating portion was started by the controller, and the second time is a time having elapsed since the supply of electric power to the heating portion was started by the controller. In the present embodiment, the first time may be 0 seconds from the start of heating, and the second time may be 1.5 seconds from the start of heating. In the present embodiment, as a specific example of waveforms in which the reference voltage at the first time is different from the reference voltage at the second time, a linear waveform is used. In the linear waveform, the reference voltage Vref changes with time linearly toward a high temperature side (i.e., a low voltage side).

In the present embodiment, the reference voltage Vref changes with the time having elapsed since the start of heating of the fixing film 101, from a low temperature side toward a high temperature side. Thus, if the temperature of the fixing film 101 rises rapidly immediately after the heating of the fixing film 101 was started, the output voltage Vth from the temperature detection element 6 enters a stop area (FIG. 16C) that is on a high temperature side with respect to the reference voltage Vref, even when the fixing film 101 has a relatively low temperature. As a result, the energization of the induction heating member 102 is stopped. Therefore, if an error occurs and the temperature of the fixing film 101 rises rapidly, the energization of the heating portion can be quickly stopped. In addition, since the reference voltage Vref is not constant but changes from a low temperature side toward a high temperature side, it is not prevented that the temperature of the fixing film rises at a normal temperature-rise speed in the first period.

In addition, in the waveform used in the present embodiment, the reference voltage Vref changes with the elapsed time toward a high temperature side in the first period after the start of heating of the fixing film 101, and has a constant value (Va) in the second period, regardless of the elapsed time. Thus, both when an error occurs and the temperature of the fixing film 101 rises rapidly, and when an error occurs and the temperature of the fixing film 101 rises gently, the energization of the induction heating member 102 can be stopped at appropriate timing before the temperature of the fixing film 101 reaches the abnormal-heating range.

In FIGS. 16A to 16C described above, the temperature of the fixing apparatus 100 at the start of printing operation is a room temperature. However, the fixing apparatus 100 may have a high temperature at the start of printing operation, as in a case where a printing operation is started immediately after the previous printing operation is completed. Hereinafter, operations performed in such a case will be described with reference to FIGS. 17A to 17C.

Figure 17A:
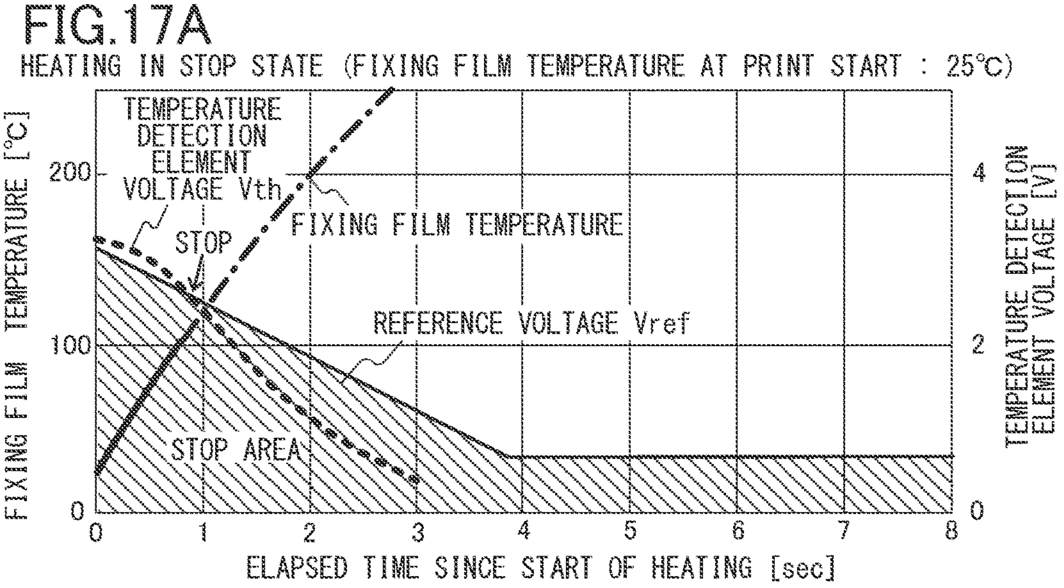
FIG. 17A is a timing chart illustrating an example of operation of the fixing apparatus of the second embodiment.
Figure 17B:
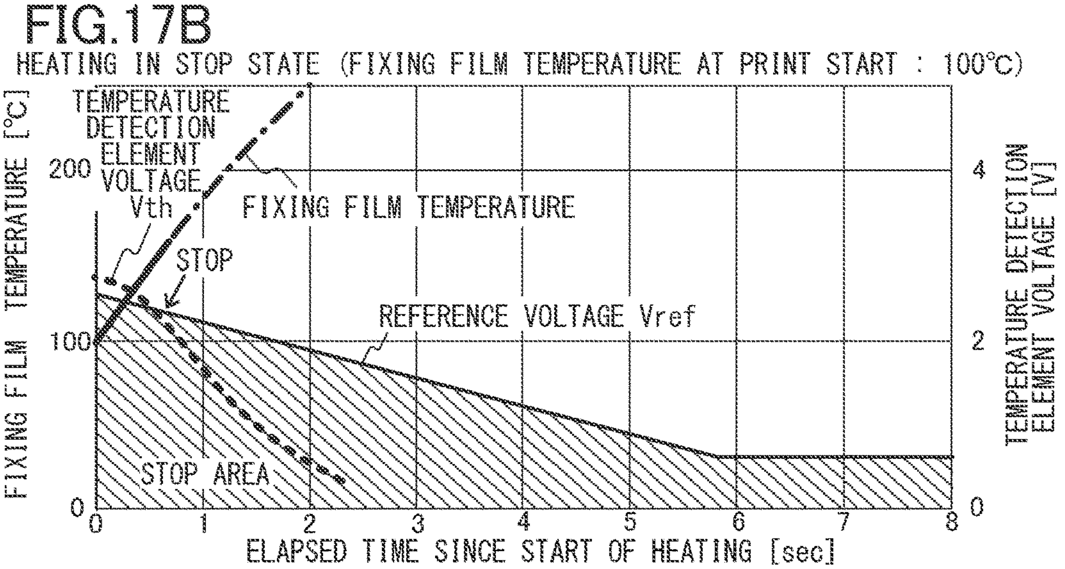
FIG. 17B is a timing chart illustrating an example of operation of the fixing apparatus of the second embodiment.

FIG. 17A illustrates the same case as that illustrated in FIG. 16C, for comparison. That is, FIG. 17A illustrates an abnormal operation in which the induction heating member 102 is energized in a state where the rotation of the fixing film 101 and the pressing roller 8 is stopped, and in which the fixing film 101 has a room temperature (25° C.) at the start of printing operation. FIG. 17B illustrates an abnormal operation in which the induction heating member 102 is energized in a state where the rotation of the fixing film 101 and the pressing roller 8 is stopped, and in which the fixing film 101 has a high temperature (100° C.) at the start of printing operation.

As described above, the output voltage from the temperature detection element 6 that corresponds to a temperature of the fixing film 101 obtained before the start of printing operation is held, as the initial voltage Vpre, by the initial voltage holder 16; and an initial value of the reference voltage Vref that corresponds to the initial voltage Vpre is given to the reference voltage generator 17. Thus, if the fixing film 101 has a high temperature at the start of printing operation, the voltage given from the initial voltage holder 16 to the reference voltage generator 17 becomes lower than a voltage given to the reference voltage generator 17 when the fixing film 101 has a room temperature at the start of printing operation. As a result, the initial value of the reference voltage Vref (i.e., a voltage at 0 seconds) illustrated in FIG. 17B becomes lower than the initial value of the reference voltage Vref illustrated in FIG. 17A. In addition, the slope of the triangular waveform becomes gentle in the first period.

Thus, even if the temperature of the fixing film 101 rises rapidly in a case where the fixing film 101 has a high temperature at the start of printing operation, the energization of the induction heating member 102 can be stopped before the temperature of the fixing film 101 enters the abnormal-heating range. Note that although the reference voltage Vref in the first period decreases as the temperature of the fixing film 101 at the start of printing operation increases, the reference voltage Vref in the second period (i.e., the voltage Va) is constant regardless of the temperature of the fixing film 101 obtained at the start of printing operation. Thus, the operation performed when the output voltage Vth from the temperature detection element 6 enters the stop area in the second period in a case where the fixing film 101 has a high temperature at the start of printing operation is the same as that described with reference to FIG. 16B.

Figure 17C:
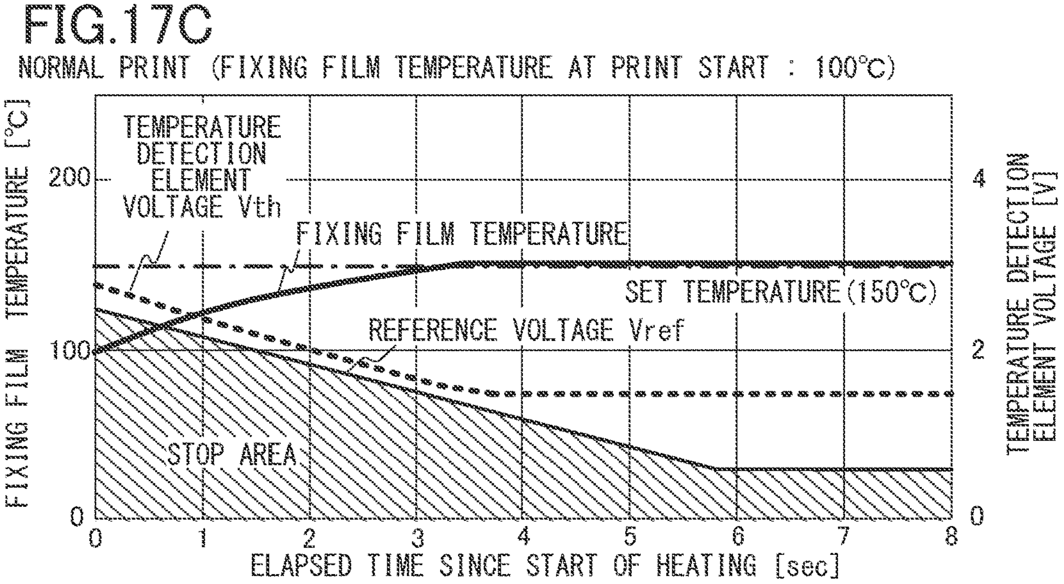
FIG. 17C is a timing chart illustrating an example of operation of the fixing apparatus of the second embodiment.

FIG. 17C illustrates a normal printing operation in which the fixing film 101 has a high temperature (100° C.) at the start of printing operation. In this case, the initial value of the reference voltage Vref is lower than the initial value of the reference voltage Vref illustrated in FIG. 17A, in which the fixing film 101 has a room temperature (25° C.) at the start of printing operation. However, since the fixing film 101 and the pressing roller 8 are normally rotated, the temperature of the fixing film 101 does not rapidly rise. Thus, the output voltage Vth from the temperature detection element 6 decreases gradually in accordance with the increase of the temperature of the fixing film 101, and after the temperature of the fixing film 101 reaches a target temperature of 150° C., the voltage Vth is kept at a substantially constant value. Thus, even if the fixing film 101 has a high temperature at the start of printing operation, the output voltage Vth from the temperature detection element 6 does not become equal to or lower than the reference voltage Vref if the printing operation is performed normally. In this case, the energization of the induction heating member 102 is not stopped.

Thus, also in the present embodiment, the initial value of the reference voltage Vref is changed in accordance with the temperature of the fixing film 101 obtained at the start of printing operation. In this manner, it is possible to quickly stop the energization of the fixing film 101 in accordance with the temperature of the fixing film 101 obtained at the start of printing operation if a rapid temperature rise of the fixing film 101 is detected, while allowing the normal temperature rise of the fixing film 101.

Since the circuits used for the description are examples, other circuits may be used as long as the other circuits have the same functions.

Third Embodiment

In a third embodiment, a fixing apparatus 100 having the same induction heating system as that of the second embodiment is used as the fixing apparatus 1. However, the third embodiment differs from the second embodiment in the circuit configuration of the reference voltage generator 17. Hereinafter, features different from those of the second embodiment will be mainly described. Since the configuration of the fixing apparatus 100, and the overall configuration of the power control circuit of the fixing apparatus 100 are substantially the same as those of the second embodiment, the description thereof will be omitted.

Excessive-Temperature-Rise Prevention Circuit

Figure 18:
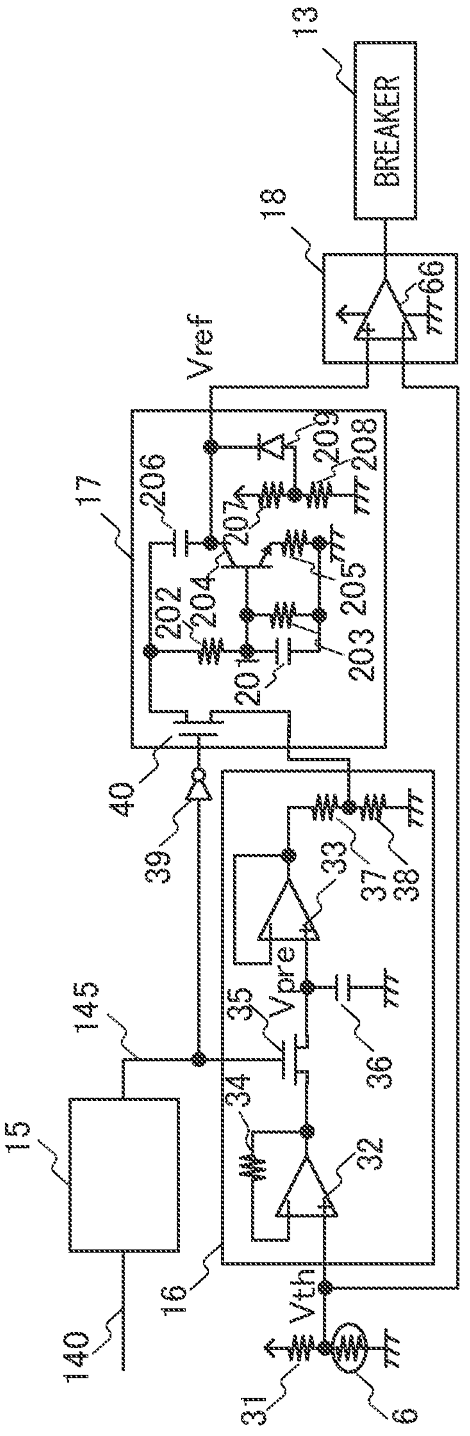
FIG. 18 is a circuit diagram of an excessive-temperature-rise prevention circuit of a third embodiment.

Next, the circuits of an excessive-temperature-rise prevention circuit 14 of the third embodiment will be described with reference to the circuit diagram of FIG. 18 and the timing charts of FIGS. 19A to 19C and 20A to 20C. Note that since the temperature detection element 6, the energizing-signal generator 15, the initial voltage holder 16, the inverter 39, and the FET switch 40 are the same as those of the first embodiment, the description thereof will be omitted.

The reference voltage generator 17 includes an upwardly-convex-curved voltage generator, which includes resistors 202, 203, and 205, capacitors 201 and 206, and a transistor 204. The curve of the voltage from the upwardly-convex-curved voltage generator with respect to time is produced by using a charging characteristic of a capacitor, and is convex toward an upward direction (i.e., a high voltage side or a low temperature side). The upwardly-convex-curved waveform voltage produced by the upwardly-convex-curved voltage generator is limited by a voltage clamp that includes resistors 207 and 208 and a diode 209, so as not to be equal to or lower than a predetermined voltage; and is outputted to a comparator 18. As a result, in a first period illustrated in FIGS. 19A to 19C and 20A to 20C, the reference voltage Vref is upwardly-convex-curved, and in a second period, the reference voltage Vref having a constant value (Va) is outputted.

The comparator 18 is constituted by a comparator 66. The comparator 18 compares the output voltage Vth from the temperature detection element 6 and the reference voltage Vref, and if the relationship of Vth≤Vref is satisfied, the comparator 18 outputs a signal that turns off the breaker 13.

Operation of Excessive-Temperature-Rise Prevention Circuit

Next, operations of the present embodiment will be described with reference to the timing charts of FIGS. 19A to 19C and 20A to 20C. Each of FIGS. 19A to 19C and 20A to 20C illustrates the temperature of the fixing film 101, the output voltage Vth from the temperature detection element 6, and the reference voltage Vref from the reference voltage generator 17, which are obtained after the start of heating. As described with reference to the circuit diagram, the reference voltage Vref is upwardly-convex-curved in the first period, and has a constant value (Va) in the second period. If the output voltage Vth from the temperature detection element 6 is closer to a high temperature side than the reference voltage Vref is (Vth≤Vref), the excessive-temperature-rise prevention circuit 14 determines that the temperature of the fixing film 101 will enter the abnormal-heating range, and stops the energization of the induction heating member 102. In the present embodiment, a period of time in which the reference voltage Vref decreases along an upwardly-convex curve is defined as the first period, and a period of time in which the reference voltage Vref has a constant value (Va) is defined as the second period.

Figure 19A:
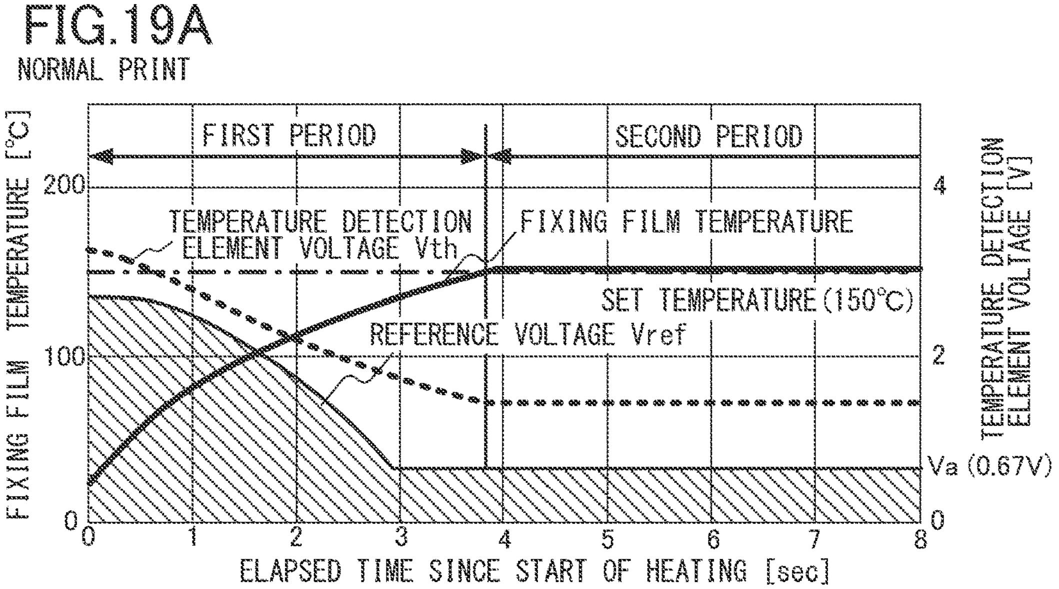
FIG. 19A is a timing chart illustrating an example of operation of the fixing apparatus of the third embodiment.

In a normal print mode (normal operation) illustrated in FIG. 19A, the temperature of the fixing film 101 rises toward a target temperature of 150° C., and is kept at about 150° C. after a certain time. After the certain time, the output voltage Vth from the temperature detection element 6 has a value corresponding to the temperature of 150° C. In this case, since the output voltage Vth from the temperature detection element 6 is always higher than the reference voltage Vref (Vth>Vref), the excessive-temperature-rise prevention circuit 14 does not stop the energization of the induction heating member 102.

Figure 19B:
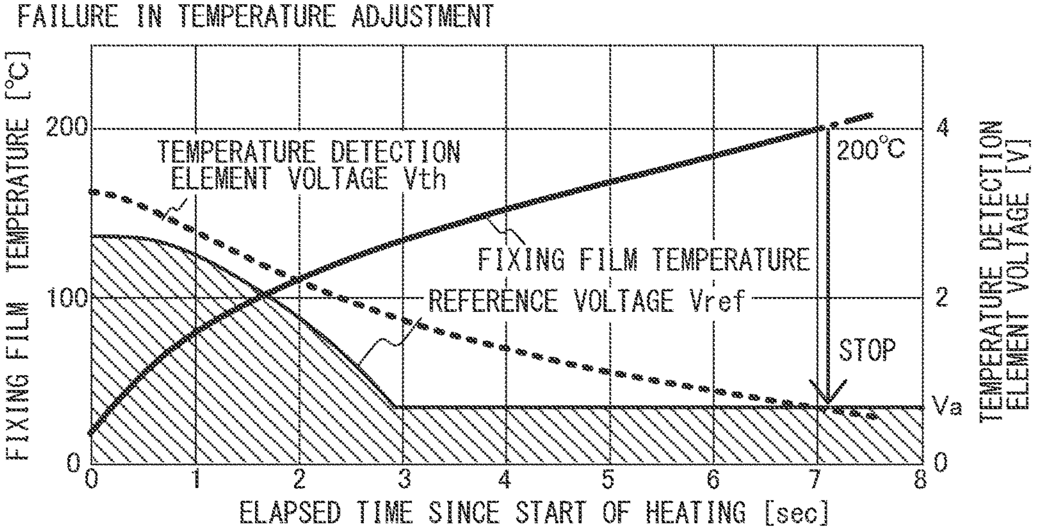
FIG. 19B is a timing chart illustrating an example of operation of the fixing apparatus of the third embodiment.

FIG. 19B illustrates an abnormal operation in which the temperature of the fixing film 101 continues to rise without becoming constant at 150° C. because the controller 11 has failed to adjust the temperature. In this case, the output voltage Vth from the temperature detection element 6 that corresponds to the temperature of the fixing film 101 also does not become constant, and continues to decrease. In this case, the output voltage Vth from the temperature detection element 6 becomes equal to the reference voltage Vref (Vth=Vref) when the temperature of the fixing film 101 reaches 200° C. in the second period, and at this timing, the excessive-temperature-rise prevention circuit 14 stops the energization of the induction heating member 102.

Figure 19C:
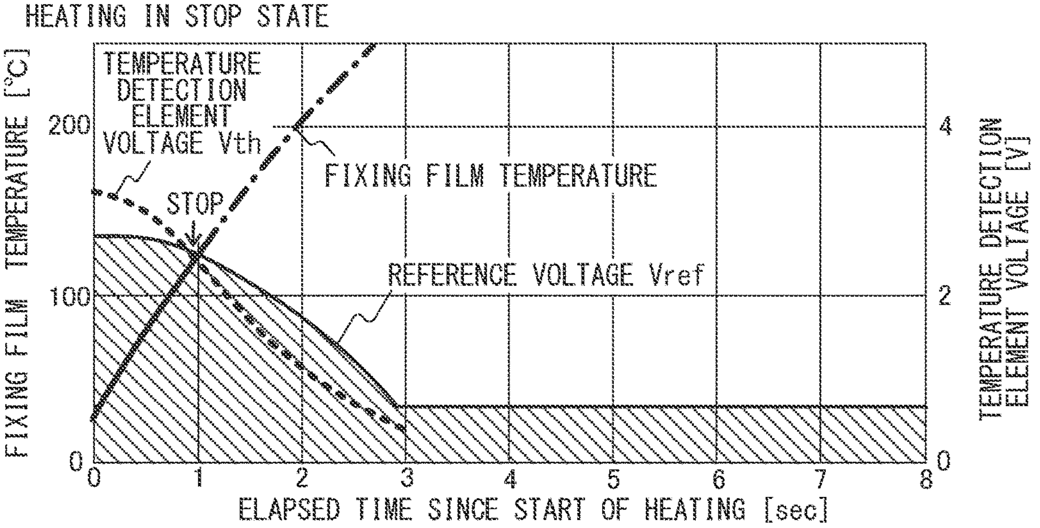
FIG. 19C is a timing chart illustrating an example of operation of the fixing apparatus of the third embodiment.

FIG. 19C illustrates an abnormal operation in which the induction heating member 102 is energized in a state where the rotation of the fixing film 101 and the pressing roller 8 is stopped. In this case, since the heat generated from the fixing film 101 is not drawn to the pressing roller 8, the temperature of the fixing film 101 rises rapidly. In this case, since the output voltage Vth from the temperature detection element 6 decreases rapidly as indicated by a broken line, the output voltage Vth from the temperature detection element 6 becomes equal to or lower than the reference voltage Vref (Vth≤Vref) in the first period. As a result, the excessive-temperature-rise prevention circuit 14 stops the energization of the induction heating member 102.

Thus, also in the present embodiment, the reference voltage Vref generated by the reference voltage generator 17 changes with the time having elapsed since the start of heating, from a low temperature side toward a high temperature side. In other words, in the present embodiment, the reference voltage generator 17 changes the reference voltage in accordance with the time having elapsed since the start of heating, such that a temperature corresponding to the reference voltage obtained when a first time has elapsed is lower than a temperature corresponding to the reference voltage obtained when a second time longer than the first time has elapsed. The first time is a time having elapsed since the supply of electric power to the heating portion was started by the controller, and the second time is a time having elapsed since the supply of electric power to the heating portion was started by the controller. In the present embodiment, as a specific example of waveforms in which the reference voltage at the first time is different from the reference voltage at the second time, an upwardly-convex-curved waveform is used. In the upwardly-convex-curved waveform, the reference voltage Vref decreases with the elapsed time along an upwardly-convex curve (i.e., a curve that is convex toward a high voltage side). Note that as a specific example of other waveforms of the reference voltage, a downwardly-convex-curved waveform may be used. In the downwardly-convex-curved waveform, the reference voltage Vref decreases with the elapsed time along a downwardly-convex curve (i.e., a curve that is convex toward a low voltage side).

In the present embodiment, the reference voltage Vref changes with the time having elapsed since the start of heating of the fixing film 101, from a low temperature side toward a high temperature side. Thus, if the temperature of the fixing film 101 rises rapidly immediately after the start of heating of the fixing film 101, the output voltage Vth from the temperature detection element 6 enters a stop area (FIG. 19C) that is on a high temperature side with respect to the reference voltage Vref, even when the fixing film 101 has a relatively low temperature. As a result, the energization of the induction heating member 102 is stopped. Therefore, if an error occurs and the temperature of the fixing film 101 rises rapidly, the energization of the heating portion can be quickly stopped. In addition, since the reference voltage Vref is not constant but changes from a low temperature side toward a high temperature side, it is not prevented that the temperature of the fixing film rises at a normal temperature-rise speed in the first period.

In addition, in the waveform used in the present embodiment, the reference voltage Vref changes with the elapsed time toward a high temperature side in the first period after the start of heating of the fixing film 101, and has a constant value (Va) in the second period, regardless of the elapsed time. Thus, both when an error occurs and the temperature of the fixing film 101 rises rapidly, and when an error occurs and the temperature of the fixing film 101 rises gently, the energization of the induction heating member 102 can be stopped at appropriate timing before the temperature of the fixing film 101 reaches the abnormal-heating range.

In FIGS. 19A to 19C described above, the temperature of the fixing apparatus 100 at the start of printing operation is a room temperature. However, the fixing apparatus 100 may have a high temperature at the start of printing operation, as in a case where a printing operation is started immediately after the previous printing operation is completed. Hereinafter, operations performed in such a case will be described with reference to FIGS. 20A to 20C.

Figure 20A:
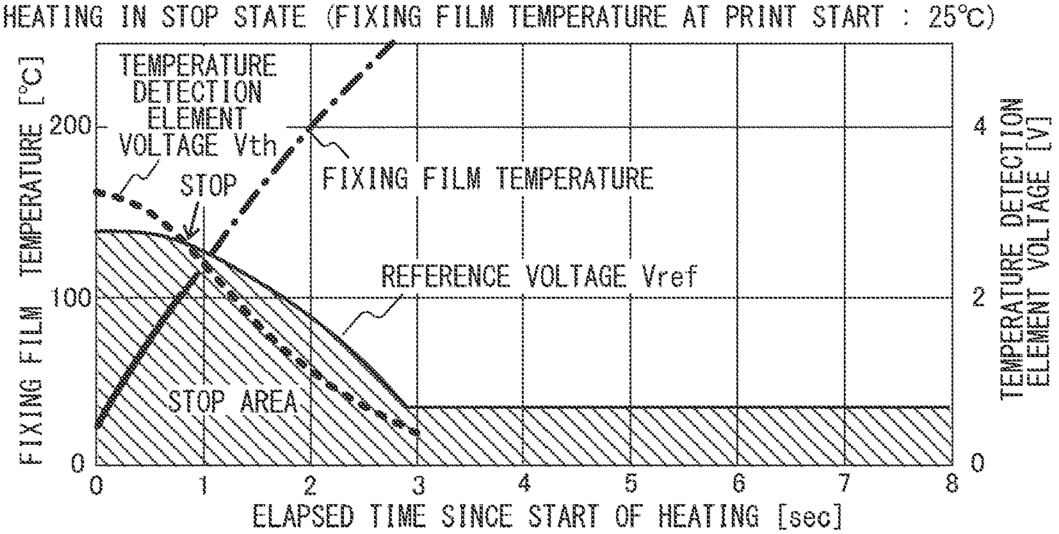
FIG. 20A is a timing chart illustrating an example of operation of the fixing apparatus of the third embodiment.
Figure 20B:
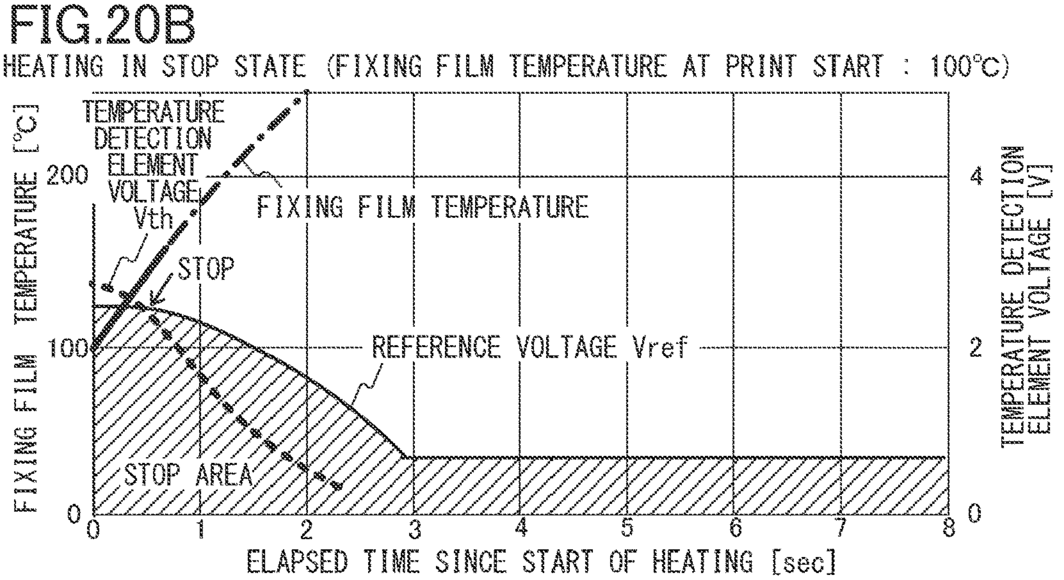
FIG. 20B is a timing chart illustrating an example of operation of the fixing apparatus of the third embodiment.

FIG. 20A illustrates the same case as that illustrated in FIG. 19C, for comparison. That is, FIG. 20A illustrates an abnormal operation in which the induction heating member 102 is energized in a state where the rotation of the fixing film 101 and the pressing roller 8 is stopped, and in which the fixing film 101 has a room temperature (25° C.) at the start of printing operation. FIG. 20B illustrates an abnormal operation in which the induction heating member 102 is energized in a state where the rotation of the fixing film 101 and the pressing roller 8 is stopped, and in which the fixing film 101 has a high temperature (100° C.) at the start of printing operation.

As described above, the output voltage from the temperature detection element 6 that corresponds to a temperature of the fixing film 101 obtained before the start of printing operation is held, as the initial voltage Vpre, by the initial voltage holder 16; and an initial value of the reference voltage Vref that corresponds to the initial voltage Vpre is given to the reference voltage generator 17. Thus, if the fixing film 101 has a high temperature at the start of printing operation, the voltage given from the initial voltage holder 16 to the reference voltage generator 17 becomes lower than a voltage given to the reference voltage generator 17 when the fixing film 101 has a room temperature at the start of printing operation. As a result, the initial value of the reference voltage Vref (i.e., a voltage at 0 seconds) illustrated in FIG. 20B becomes lower than the initial value of the reference voltage Vref illustrated in FIG. 20A.

Thus, even if the temperature of the fixing film 101 rises rapidly in a case where the fixing film 101 has a high temperature at the start of printing operation, the energization of the induction heating member 102 can be stopped before the temperature of the fixing film 101 enters the abnormal-heating range. Note that although the reference voltage Vref in the first period decreases as the temperature of the fixing film 101 at the start of printing operation increases, the reference voltage Vref in the second period (i.e., the voltage Va) is constant regardless of the temperature of the fixing film 101 obtained at the start of printing operation. Thus, the operation performed when the output voltage Vth from the temperature detection element 6 enters the stop area in the second period in a case where the fixing film 101 has a high temperature at the start of printing operation is the same as that described with reference to FIG. 19B.

Figure 20C:
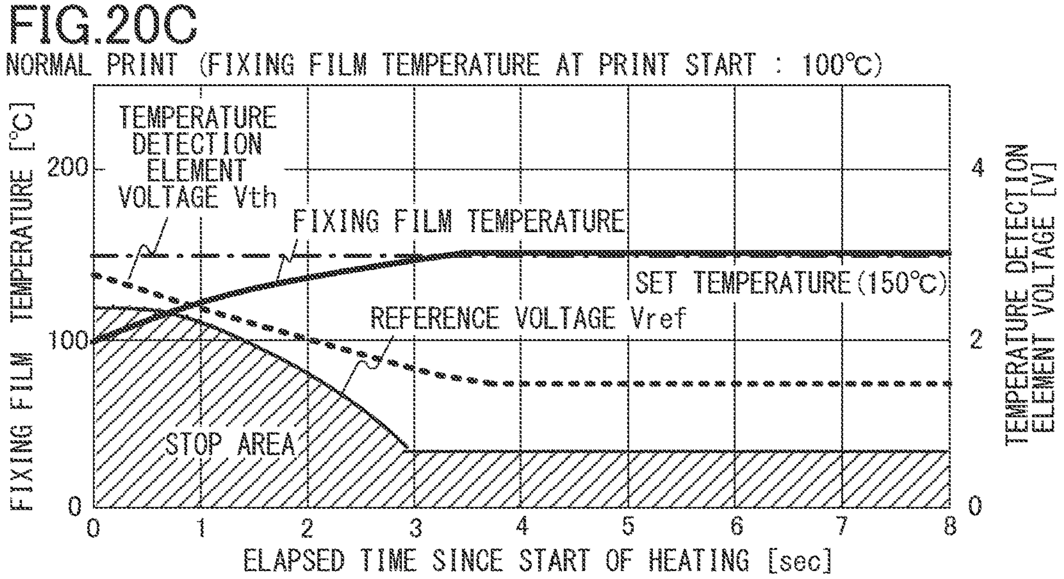
FIG. 20C is a timing chart illustrating an example of operation of the fixing apparatus of the third embodiment.

FIG. 20C illustrates a normal printing operation in which the fixing film 101 has a high temperature (100° C.) at the start of printing operation. In this case, the initial value of the reference voltage Vref is lower than the initial value of the reference voltage Vref illustrated in FIG. 20A, in which the fixing film 101 has a room temperature (25° C.) at the start of printing operation. However, since the fixing film 101 and the pressing roller 8 are normally rotated, the temperature of the fixing film 101 does not rapidly rise. Thus, the output voltage Vth from the temperature detection element 6 decreases gradually in accordance with the increase of the temperature of the fixing film 101, and after the temperature of the fixing film 101 reaches a target temperature of 150° C., the voltage Vth is kept at a substantially constant value. Thus, even if the fixing film 101 has a high temperature at the start of printing operation, the output voltage Vth from the temperature detection element 6 does not become equal to or lower than the reference voltage Vref if the printing operation is performed normally. In this case, the energization of the induction heating member 102 is not stopped.

Thus, also in the present embodiment, the initial value of the reference voltage Vref is changed in accordance with the temperature of the fixing film 101 obtained at the start of printing operation. In this manner, it is possible to quickly stop the energization of the fixing film 101 in accordance with the temperature of the fixing film 101 obtained at the start of printing operation if a rapid temperature rise of the fixing film 101 is detected, while allowing the normal temperature rise of the fixing film 101.

Since the circuits used for the description are examples, other circuits may be used as long as the other circuits have the same functions.

Fourth Embodiment

In a fourth embodiment, a fixing apparatus 100 having the same induction heating system as that of the second embodiment is used as the fixing apparatus 1. However, the fourth embodiment differs from the second embodiment in the temperature detection element 6 and the circuit configuration of the reference voltage generator 17. Hereinafter, features different from those of the second embodiment will be mainly described. Since the configuration of the fixing apparatus 100, and the overall configuration of the power control circuit of the fixing apparatus 100 are substantially the same as those of the second embodiment, the description thereof will be omitted.

Figure 21:
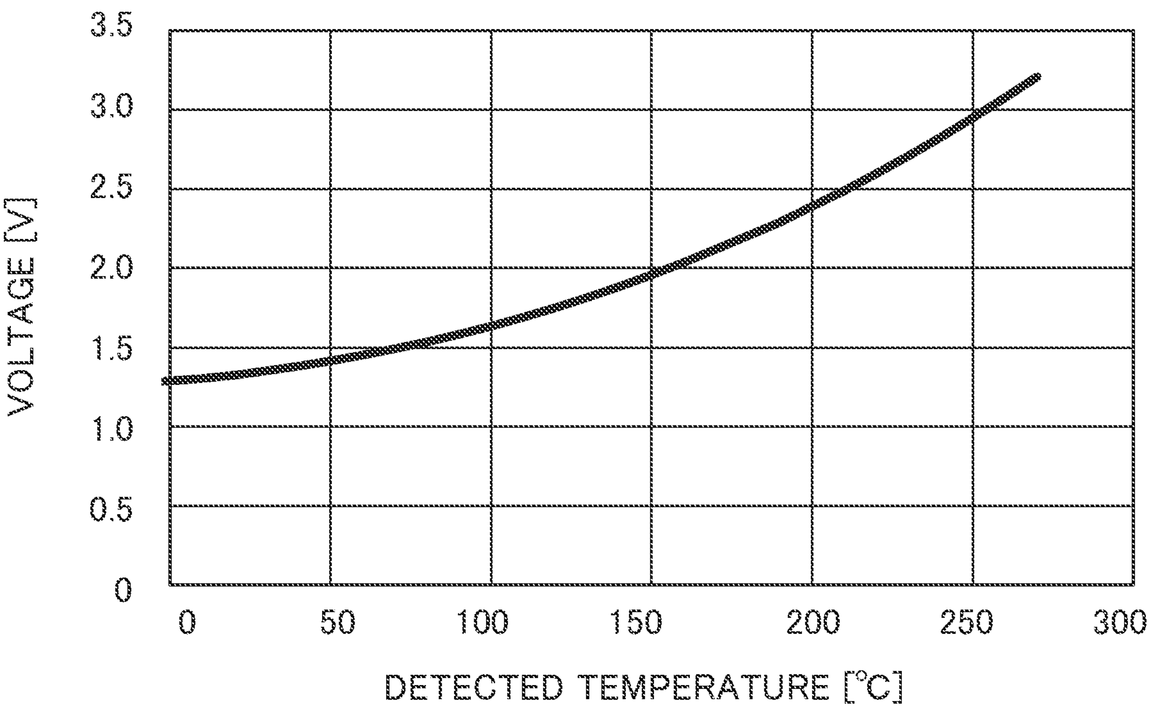
FIG. 21 is a graph illustrating temperature characteristics of a temperature detection element of a fourth embodiment.

As illustrated in FIG. 21, a temperature detection element 310 (FIG. 23) of the present embodiment has characteristics in which the output voltage increases (i.e., increases monotonously) as the detected temperature increases. For example, if values of the detected temperature are a first temperature (e.g., 100° C.) and a second temperature (e.g., 200° C.) higher than the first temperature, the output voltage corresponding to the second temperature is higher than the output voltage corresponding to the first temperature. In general, the control method described below can be applied to a temperature detection member having the characteristics in which the output voltage increases as the detected temperature increases. In the present embodiment, a thermopile is used as the temperature detection element 310. The thermopile is disposed outside the fixing film 101. Except for the temperature detection element 310, the configuration of the fixing apparatus 100, and the overall configuration of the power control circuit are substantially the same as those of the second embodiment.

Figure 22:
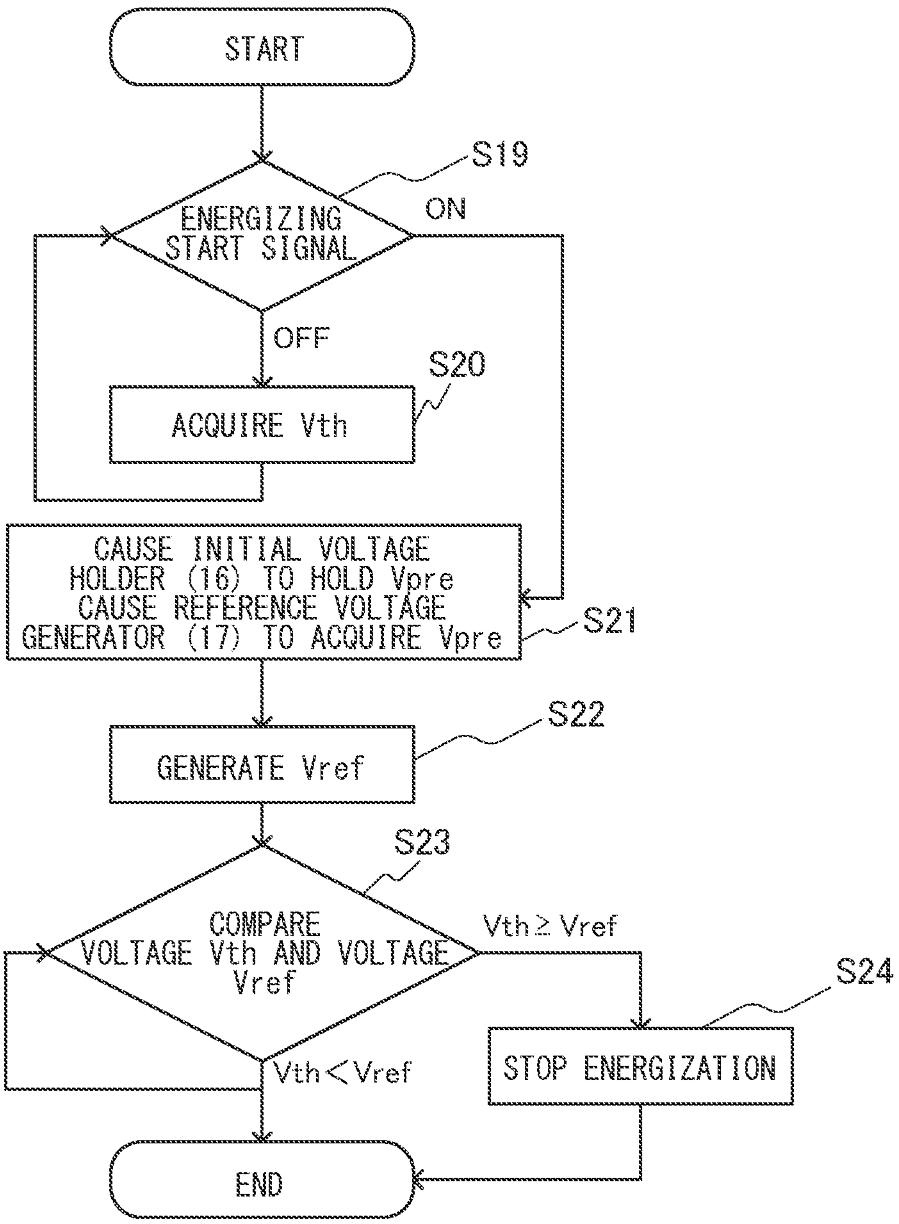
FIG. 22 is a flowchart of excessive-temperature-rise prevention control of the fourth embodiment.

Next, the conditions of operation will be further described with reference to the flowchart of FIG. 22. While the energizing signal is OFF (S19: OFF), the initial voltage holder 16 receives an output voltage Vth from the temperature detection element 310 at predetermined time intervals (S20). The output voltage Vth is a voltage obtained before the start of printing operation. If the energizing signal is turned ON (S19: ON), the initial voltage holder 16 holds an output voltage Vth from the temperature detection element 310, as an initial voltage Vpre, obtained immediately before the start of printing operation, and the reference voltage generator 17 receives a voltage corresponding to the initial voltage Vpre, as an initial value (S21).

After that, the reference voltage generator 17 generates the reference voltage that changes with the elapsed time from the initial value that corresponds to the initial voltage Vpre (S22). The comparator 18 compares the reference voltage Vref outputted from the reference voltage generator 17 and the output voltage Vth outputted from the temperature detection element 310 (S23). If the output voltage Vth from the temperature detection element 310 is closer to a high temperature side than the reference voltage Vref from the reference voltage generator 17 is, the breaker 13 stops the energization of the induction heating member 102 performed by the power source 12 (S24). In the present embodiment, since the output voltage from the temperature detection element 310 increases monotonously as the detected temperature increases, the relationship of Vth≥Vref is satisfied when the output voltage Vth is closer to a high temperature side than the reference voltage Vref is. In other words, with respect to the output voltage of the temperature detection element 310 and the reference voltage Vref, "high temperature side" refers to a side (i.e., upper side in FIGS. 21, 24A to 24C, and 25A to 25C) where an absolute value of the voltage is large, and "low temperature side" refers to a side (i.e., lower side in FIGS. 21, 24A to 24C, and 25A to 25C) where an absolute value of the voltage is small.

Excessive-Temperature-Rise Prevention Circuit

Next, the circuits of an excessive-temperature-rise prevention circuit 14 of the fourth embodiment will be described with reference to the circuit diagram of FIG. 23 and the timing charts of FIGS. 24A to 24C and 25A to 25C. Note that since the energizing-signal generator 15, the initial voltage holder 16, the inverter 39, and the FET switch 40 are the same as those of the third embodiment, the description thereof will be omitted.

Figure 23:
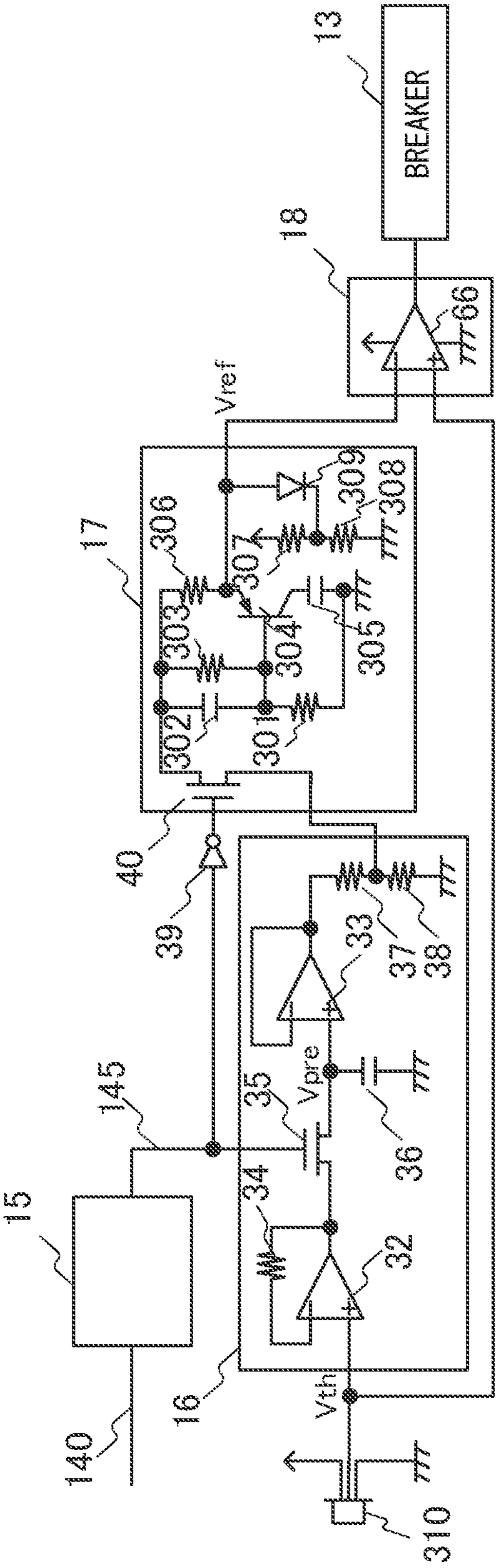
FIG. 23 is a circuit diagram of an excessive-temperature-rise prevention circuit of the fourth embodiment.

As illustrated in FIG. 23, in the present embodiment, the temperature detection element 310 is a thermopile, and the output voltage Vth from the temperature detection element 310 is outputted to the initial voltage holder 16 and the comparator 18.

The reference voltage generator 17 includes a downwardly-convex-curved voltage generator, which includes resistors 301, 303, and 306, capacitors 302 and 305, and a transistor 304. The curve of the voltage from the downwardly-convex-curved voltage generator with respect to time is produced by using a charging characteristic of a capacitor, and is convex toward a downward direction (i.e., a low voltage side or a low temperature side). The downwardly-convex-curved waveform voltage produced by the downwardly-convex-curved voltage generator is limited by a voltage limiter that includes resistors 307 and 308 and a diode 309, so as not to be equal to or higher than a predetermined voltage Vb; and is outputted to the comparator 18. As a result, in a first period illustrated in FIGS. 24A to 24C and 25A to 25C, the reference voltage Vref is downwardly-convex-curved, and in a second period, the reference voltage Vref having a constant value (Vb) is outputted. The reference voltage Vref is the constant voltage Vb of 2.4 V in the second period. However, if the temperature detection element 310 has characteristics different from those illustrated in FIG. 21, the reference voltage Vref has a different constant value.

The comparator 18 is constituted by a comparator 66. The comparator 18 compares the output voltage Vth from the temperature detection element 310 and the reference voltage Vref, and if the relationship of Vth≥Vref is satisfied, the comparator 18 outputs a signal that turns off the breaker 13. In the present embodiment, since the output voltage from the temperature detection element 310 increases monotonously as the detected temperature increases, the relationship of Vth≥Vref is satisfied when the output voltage Vth is closer to a high temperature side than the reference voltage Vref is.

Operation of Excessive-Temperature-Rise Prevention Circuit

Next, operations of the present embodiment will be described with reference to the timing charts of FIGS. 24A to 24C and 25A to 25C. Each of FIGS. 24A to 24C and 25A to 25C illustrates the temperature of the fixing film 101, the output voltage Vth from the temperature detection element 310, and the reference voltage Vref from the reference voltage generator 17, which are obtained after the start of heating. As described with reference to the circuit diagram, the reference voltage Vref is downwardly-convex-curved in a first period, and has a constant value (Vb) in a second period. If the output voltage Vth from the temperature detection element 310 is closer to a high temperature side than the reference voltage Vref is (Vth≥Vref), the excessive-temperature-rise prevention circuit 14 determines that the temperature of the fixing film 101 will enter the abnormal-heating range, and stops the energization of the induction heating member 102. In the present embodiment, a period of time in which the reference voltage Vref rises along a downwardly-convex curve is defined as the first period, and a period of time in which the reference voltage Vref has a constant value (Vb) is defined as the second period.

Figure 24A:
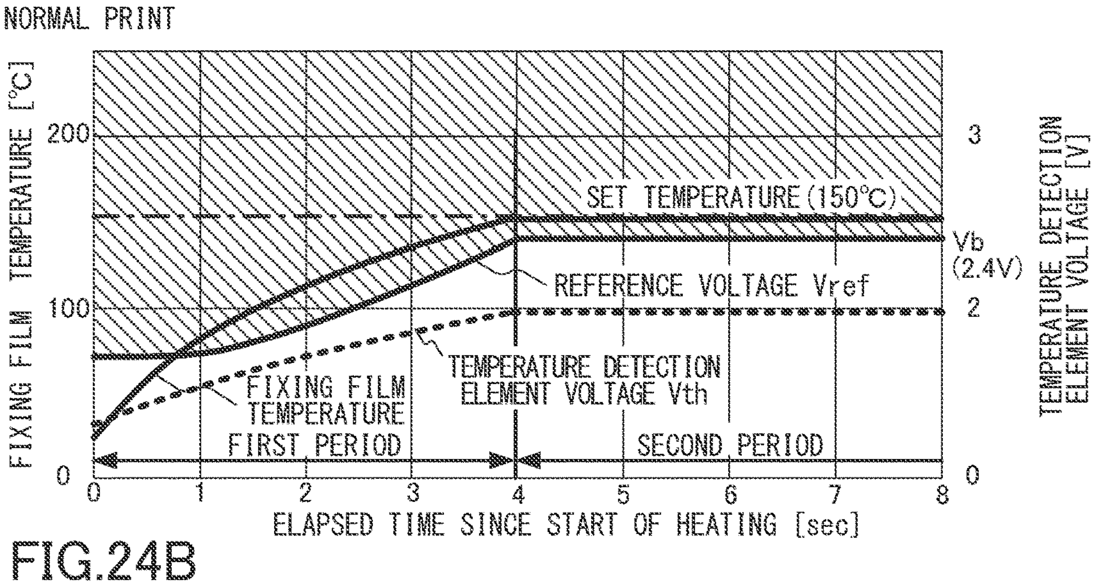
FIG. 24A is a timing chart illustrating an example of operation of the fixing apparatus of the fourth embodiment.

In a normal print mode (normal operation) illustrated in FIG. 24A, the temperature of the fixing film 101 rises toward a target temperature of 150° C., and is kept at about 150° C. after a certain time. After the certain time, the output voltage Vth from the temperature detection element 310 has a value corresponding to the temperature of 150° C. In this case, since the output voltage Vth from the temperature detection element 310 is always lower than the reference voltage Vref (Vth>Vref), the excessive-temperature-rise prevention circuit 14 does not stop the energization of the induction heating member 102.

Figure 24B:
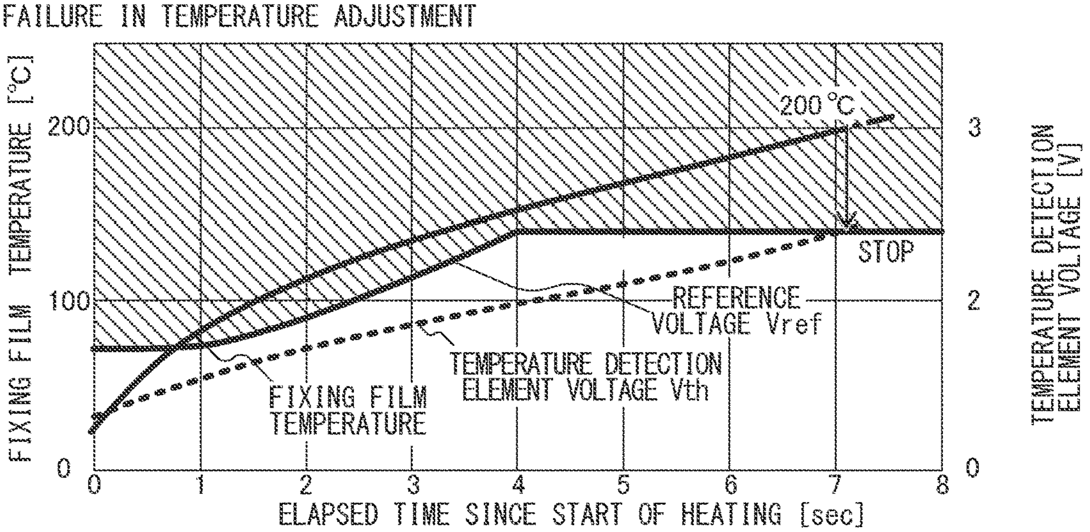
FIG. 24B is a timing chart illustrating an example of operation of the fixing apparatus of the fourth embodiment

FIG. 24B illustrates an abnormal operation in which the temperature of the fixing film 101 continues to rise without becoming constant at 150° C. because the controller 11 has failed to adjust the temperature. In this case, the output voltage Vth from the temperature detection element 310 that corresponds to the temperature of the fixing film 101 also does not become constant, and continues to rise. In this case, the output voltage Vth from the temperature detection element 310 becomes equal to the reference voltage Vref (Vth=Vref) when the temperature of the fixing film 101 reaches 200° C. in the second period, and at this timing, the excessive-temperature-rise prevention circuit 14 stops the energization of the induction heating member 102.

Figure 24C:
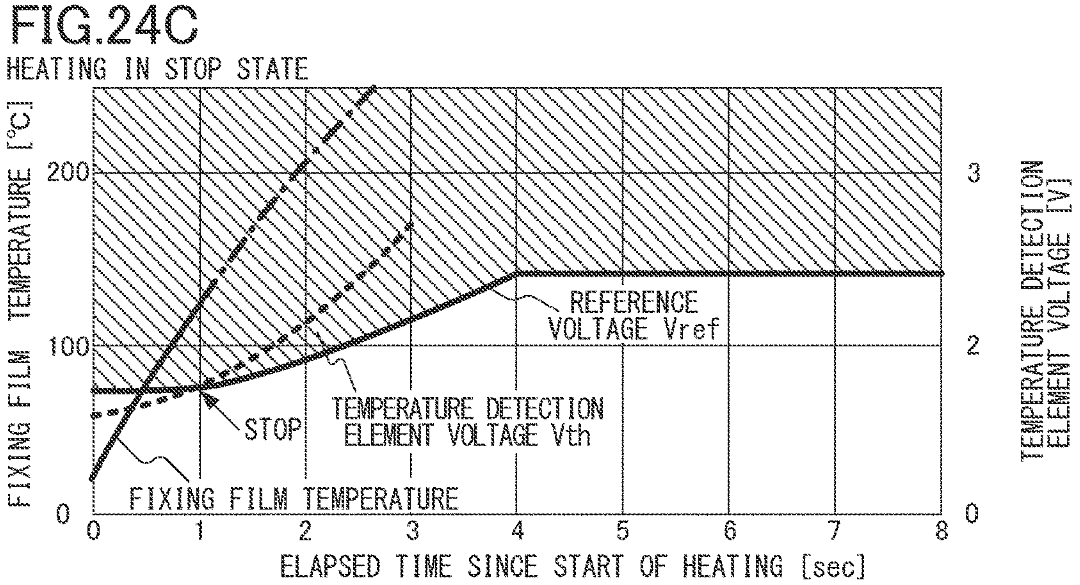
FIG. 24C is a timing chart illustrating an example of operation of the fixing apparatus of the fourth embodiment.

FIG. 24C illustrates an abnormal operation in which the induction heating member 102 is energized in a state where the rotation of the fixing film 101 and the pressing roller 8 is stopped. In this case, since the heat generated from the fixing film 101 is not drawn to the pressing roller 8, the temperature of the fixing film 101 rises rapidly. In this case, since the output voltage Vth from the temperature detection element 310 increases rapidly as indicated by a broken line, the output voltage Vth from the temperature detection element 310 becomes equal to or higher than the reference voltage Vref (Vth≥Vref) in the first period. As a result, the excessive-temperature-rise prevention circuit 14 stops the energization of the induction heating member 102.

Thus, also in the present embodiment, the reference voltage Vref generated by the reference voltage generator 17 changes with the time having elapsed since the start of heating, from a low temperature side toward a high temperature side. In other words, in the present embodiment, the reference voltage generator 17 changes the reference voltage in accordance with the time having elapsed since the start of heating, such that a temperature corresponding to the reference voltage obtained when a first time has elapsed is lower than a temperature corresponding to the reference voltage obtained when a second time longer than the first time has elapsed. The first time is a time having elapsed since the supply of electric power to the heating portion was started by the controller, and the second time is a time having elapsed since the supply of electric power to the heating portion was started by the controller. In the present embodiment, as a specific example of waveforms in which the reference voltage at the first time is different from the reference voltage at the second time, a downwardly-convex-curved waveform is used. In the downwardly-convex-curved waveform, the reference voltage Vref rises with the elapsed time along a downwardly-convex curve (i.e., a curve that is convex toward a low voltage side). Note that as a specific example of other waveforms of the reference voltage, an upwardly-convex-curved waveform is used. In the upwardly-convex-curved waveform, the reference voltage Vref rises with the elapsed time along an upwardly-convex curve (i.e., a curve that is convex toward a high voltage side).

In the present embodiment, the reference voltage Vref changes with the time having elapsed since the start of heating of the fixing film 101, from a low temperature side toward a high temperature side. Thus, if the temperature of the fixing film 101 rises rapidly immediately after the start of heating of the fixing film 101, the output voltage Vth from the temperature detection element 310 enters a stop area (FIG. 24C) that is on a high temperature side with respect to the reference voltage Vref, even when the fixing film 101 has a relatively low temperature. As a result, the energization of the induction heating member 102 is stopped. Therefore, if an error occurs and the temperature of the fixing film 101 rises rapidly, the energization of the heating portion can be quickly stopped. In addition, since the reference voltage Vref is not constant but changes from a low temperature side toward a high temperature side, it is not prevented that the temperature of the fixing film rises at a normal temperature-rise speed in the first period.

In addition, in the waveform used in the present embodiment, the reference voltage Vref changes with the elapsed time toward a high temperature side in the first period after the start of heating of the fixing film 101, and has a constant value (Vb) in the second period, regardless of the elapsed time. Thus, both when an error occurs and the temperature of the fixing film 101 rises rapidly, and when an error occurs and the temperature of the fixing film 101 rises gently, the energization of the induction heating member 102 can be stopped at appropriate timing before the temperature of the fixing film 101 reaches the abnormal-heating range.

In FIGS. 24A to 24C described above, the temperature of the fixing apparatus 100 at the start of printing operation is a room temperature. However, the fixing apparatus 100 may have a high temperature at the start of printing operation, as in a case where a printing operation is started immediately after the previous printing operation is completed. Hereinafter, operations performed in such a case will be described with reference to FIGS. 25A to 25C.

Figure 25A:
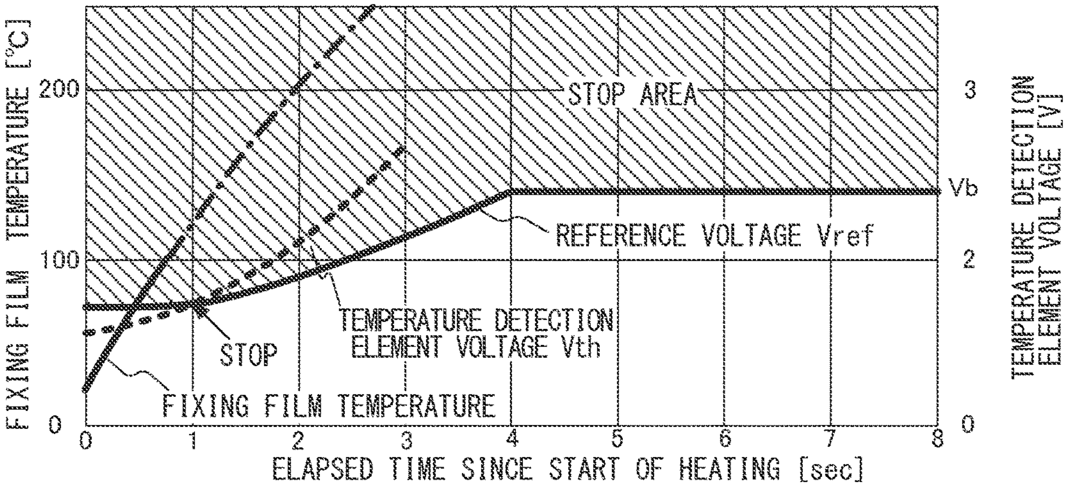
FIG. 25A is a timing chart illustrating an example of operation of the fixing apparatus of the fourth embodiment.
Figure 25B:
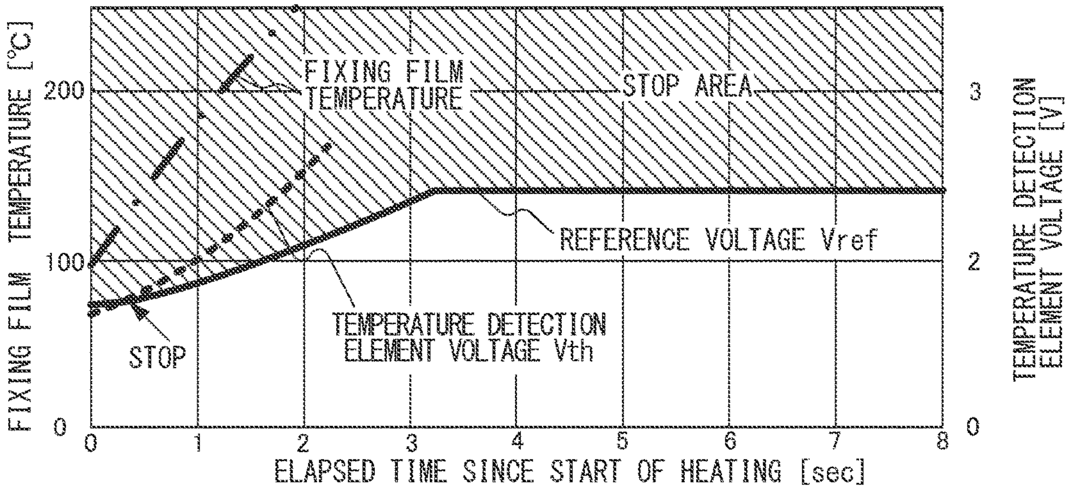
FIG. 25B is a timing chart illustrating an example of operation of the fixing apparatus of the fourth embodiment.

FIG. 25A illustrates the same case as that illustrated in FIG. 24C, for comparison. That is, FIG. 25A illustrates an abnormal operation in which the induction heating member 102 is energized in a state where the rotation of the fixing film 101 and the pressing roller 8 is stopped, and in which the fixing film 101 has a room temperature (25° C.) at the start of printing operation. FIG. 25B illustrates an abnormal operation in which the induction heating member 102 is energized in a state where the rotation of the fixing film 101 and the pressing roller 8 is stopped, and in which the fixing film 101 has a high temperature (100° C.) at the start of printing operation.

As described above, the output voltage from the temperature detection element 310 that corresponds to a temperature of the fixing film 101 obtained before the start of printing operation is held, as the initial voltage Vpre, by the initial voltage holder 16; and an initial value of the reference voltage Vref that corresponds to the initial voltage Vpre is given to the reference voltage generator 17. Thus, if the fixing film 101 has a high temperature at the start of printing operation, the voltage given from the initial voltage holder 16 to the reference voltage generator 17 becomes higher than a voltage given to the reference voltage generator 17 when the fixing film 101 has a room temperature at the start of printing operation. As a result, the initial value of the reference voltage Vref (i.e., a voltage at 0 seconds) illustrated in FIG. 25B becomes higher than the initial value of the reference voltage Vref illustrated in FIG. 25A.

Thus, even if the temperature of the fixing film 101 rises rapidly in a case where the fixing film 101 has a high temperature at the start of printing operation, the energization of the induction heating member 102 can be stopped before the temperature of the fixing film 101 enters the abnormal-heating range. Note that although the reference voltage Vref in the first period increases as the temperature of the fixing film 101 at the start of printing operation increases, the reference voltage Vref in the second period (i.e., the voltage Vb) is constant regardless of the temperature of the fixing film 101 obtained at the start of printing operation. Thus, the operation performed when the output voltage Vth from the temperature detection element 310 enters the stop area in the second period in a case where the fixing film 101 has a high temperature at the start of printing operation is the same as that described with reference to FIG. 24B.

Figure 25C:
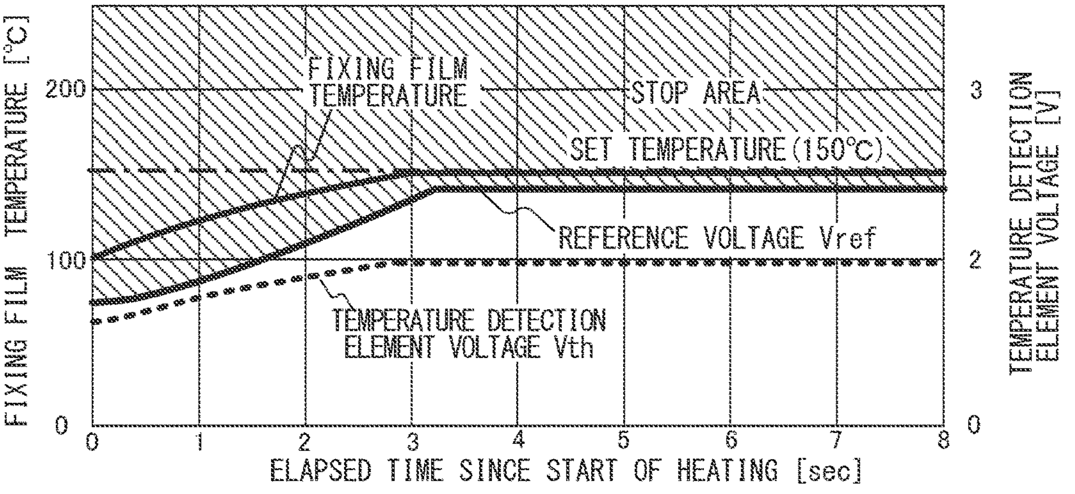
FIG. 25C is a timing chart illustrating an example of operation of the fixing apparatus of the fourth embodiment.

FIG. 25C illustrates a normal printing operation in which the fixing film 101 has a high temperature (100° C.) at the start of printing operation. In this case, the initial value of the reference voltage Vref is higher than the initial value of the reference voltage Vref illustrated in FIG. 25A, in which the fixing film 101 has a room temperature (25° C.) at the start of printing operation. However, since the fixing film 101 and the pressing roller 8 are normally rotated, the temperature of the fixing film 101 does not rapidly rise. Thus, the output voltage Vth from the temperature detection element 310 increases gradually in accordance with the increase of the temperature of the fixing film 101, and after the temperature of the fixing film 101 reaches a target temperature of 150° C., the voltage Vth is kept at a substantially constant value. Thus, even if the fixing film 101 has a high temperature at the start of printing operation, the output voltage Vth from the temperature detection element 310 does not become equal to or higher than the reference voltage Vref if the printing operation is performed normally. In this case, the energization of the induction heating member 102 is not stopped.

Thus, also in the present embodiment, the initial value of the reference voltage Vref is changed in accordance with the temperature of the fixing film 101 obtained at the start of printing operation. In this manner, it is possible to quickly stop the energization of the induction heating member 102 in accordance with the temperature of the fixing film 101 obtained at the start of printing operation if a rapid temperature rise of the fixing film 101 is detected, while allowing the normal temperature rise of the fixing film 101.

Since the circuits used for the description are examples, other circuits may be used as long as the other circuits have the same functions.

As described above, if an error occurs and the temperature of the fixing member rises rapidly, the energization of the heating portion can be quickly stopped by the technique of the present disclosure.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-125555, filed on Jul. 30, 2021, which is hereby incorporated by reference herein in its entirety.

What is claimed is:

1. An image forming apparatus comprising:

a fixing member configured to fix a toner image transferred onto a recording material, to the recording material by heating the toner image;

a heating portion configured to heat the fixing member by being supplied with electric power;

a power source configured to supply electric power to the heating portion;

a temperature detector configured to output an output voltage that corresponds to a temperature of the fixing member or a temperature of the heating portion;

a controller configured to control power supply from the power source to the heating portion based on the output voltage from the temperature detector, such that the temperature of the fixing member is maintained at a predetermined temperature;

a reference voltage generator configured to generate a reference voltage; and a breaker configured to stop the power supply from the power source to the heating portion when a temperature that corresponds to the output voltage from the temperature detector becomes higher than a temperature that corresponds to the reference voltage, wherein the reference voltage generator is configured to output the reference voltage that changes with time having elapsed since a start of heating at which the power supply to the heating portion was started by the controller, such that a temperature corresponding to the reference voltage obtained when a first time has elapsed since the start of heating is lower than a temperature corresponding to the reference voltage obtained when a second time longer than the first time has elapsed since the start of heating, and wherein the reference voltage generator is configured to change the reference voltage such that the reference voltage changes linearly with the time having elapsed since the start of heating, from a low temperature side toward a high temperature side.

2. An image forming apparatus comprising:

a fixing member configured to fix a toner image transferred onto a recording material, to the recording material by heating the toner image;

a heating portion configured to heat the fixing member by being supplied with electric power;

a power source configured to supply electric power to the heating portion;

a temperature detector configured to output an output voltage that corresponds to a temperature of the fixing member or a temperature of the heating portion;

a controller configured to control power supply from the power source to the heating portion based on the output voltage from the temperature detector, such that the temperature of the fixing member is maintained at a predetermined temperature;

a reference voltage generator configured to generate a reference voltage; and a breaker configured to stop the power supply from the power source to the heating portion when a temperature that corresponds to the output voltage from the temperature detector becomes higher than a temperature that corresponds to the reference voltage, wherein the reference voltage generator is configured to output the reference voltage that changes with time having elapsed since a start of heating at which the power supply to the heating portion was started by the controller, such that a temperature corresponding to the reference voltage obtained when a first time has elapsed since the start of heating is lower than a temperature corresponding to the reference voltage obtained when a second time longer than the first time has elapsed since the start of heating, and wherein the reference voltage generator is configured to change the reference voltage such that the reference voltage changes along a curve that is convex toward a high temperature side or a low temperature side, with the time having elapsed since the start of heating.

3. The image forming apparatus according to claim 1, wherein the reference voltage generator is configured to (i) output the reference voltage that changes with the time having elapsed since the start of heating, in a period of time from when the heating was started until a predetermined time has elapsed, and (ii) output the reference voltage that has a constant value regardless of the time having elapsed since the start of heating, after the predetermined time has elapsed since the start of heating.

4. The image forming apparatus according to claim 3, wherein a temperature corresponding to the reference voltage obtained after the predetermined time has elapsed since the start of heating is higher than a temperature corresponding to the reference voltage obtained in a period of time from when the heating was started until the predetermined time has elapsed.

5. An image forming apparatus comprising:

a fixing member configured to fix a toner image transferred onto a recording material, to the recording material by heating the toner image;

a heating portion configured to heat the fixing member by being supplied with electric power;

a power source configured to supply electric power to the heating portion;

a temperature detector configured to output an output voltage that corresponds to a temperature of the fixing member or a temperature of the heating portion;

a controller configured to control power supply from the power source to the heating portion based on the output voltage from the temperature detector, such that the temperature of the fixing member is maintained at a predetermined temperature;

a reference voltage generator configured to generate a reference voltage;

a breaker configured to stop the power supply from the power source to the heating portion when a temperature that corresponds to the output voltage from the temperature detector becomes higher than a temperature that corresponds to the reference voltage; and an initial voltage holder configured to hold the output voltage from the temperature detector obtained at a start of heating at which the power supply to the heating portion was started by the controller, and provide a voltage corresponding to the output voltage to the reference voltage generator, wherein the reference voltage generator is configured to output the reference voltage that changes with time having elapsed since the start of heating at which the power supply to the heating portion was started by the controller, such that a temperature corresponding to the reference voltage obtained when a first time has elapsed since the start of heating is lower than a temperature corresponding to the reference voltage obtained when a second time longer than the first time has elapsed since the start of heating, and wherein the reference voltage generated by the reference voltage generator changes in accordance with the voltage given from the initial voltage holder.

6. The image forming apparatus according to claim 5, wherein (i) the reference voltage when a temperature corresponding to the output voltage from the temperature detector obtained at the start of heating is a first temperature is shifted toward a high temperature side compared to (ii) the reference voltage when a temperature corresponding to the output voltage from the temperature detector obtained at the start of heating is a second temperature lower than the first temperature.

7. The image forming apparatus according to claim 1, wherein;

the fixing member is a flexible tubular film member, the heating portion includes a heater including a resistor that generates heat when electric current is passed therethrough, and disposed in an internal space of the film member, the image forming apparatus further includes a pressing roller facing the heater via the film member and configured to form a nip portion between the pressing roller and the heater, and the image forming apparatus is configured to nip and convey the recording material in the nip portion by the film member and the pressing roller such that the toner image is fixed to the recording material by the film member heated by non-radiant heat from the heater.

8. The image forming apparatus according to claim 7, wherein the heater is an integrated member in which the resistor that generates heat is buried in an insulating substrate made of $Al_2O_3$ or AlN.

9. The image forming apparatus according to claim 1, wherein:

the fixing member is a rotary member including a conductive layer, the heating portion includes a coil that generates an alternating magnetic field when applied with an alternating voltage, such that the conductive layer applied with the alternating magnetic field is heated through induction heating, the image forming apparatus further includes a facing member configured to form a nip portion between the facing member and the rotary member, and the image forming apparatus is configured to nip and convey the recording material in the nip portion by the rotary member and the facing member such that the toner image is fixed to the recording material by the rotary member heated through the induction heating.

10. The image forming apparatus according to claim 2, wherein:

the fixing member is a flexible tubular film member, the heating portion includes a heater including a resistor that generates heat when electric current is passed therethrough, and disposed in an internal space of the film member, the image forming apparatus further includes a pressing roller facing the heater via the film member and configured to form a nip portion between the pressing roller and the heater, and the image forming apparatus is configured to nip and convey the recording material in the nip portion by the film member and the pressing roller such that the toner image is fixed to the recording material by the film member heated by non-radiant heat from the heater.

11. The image forming apparatus according to claim 10, wherein the heater is an integrated member in which the resistor that generates heat is buried in an insulating substrate made of Al2O3 or AlN.

12. The image forming apparatus according to claim 2, wherein:

the fixing member is a rotary member including a conductive layer, the heating portion includes a coil that generates an alternating magnetic field when applied with an alternating voltage, such that the conductive layer applied with the alternating magnetic field is heated through induction heating, the image forming apparatus further includes a facing member configured to form a nip portion between the facing member and the rotary member, and the image forming apparatus is configured to nip and convey the recording material in the nip portion by the rotary member and the facing member such that the toner image is fixed to the recording material by the rotary member heated through the induction heating.

13. The image forming apparatus according to claim 5, wherein:

the fixing member is a flexible tubular film member, the heating portion includes a heater including a resistor that generates heat when electric current is passed therethrough, and disposed in an internal space of the film member, the image forming apparatus further includes a pressing roller facing the heater via the film member and configured to form a nip portion between the pressing roller and the heater, and the image forming apparatus is configured to nip and convey the recording material in the nip portion by the film member and the pressing roller such that the toner image is fixed to the recording material by the film member heated by non-radiant heat from the heater.

14. The image forming apparatus according to claim 13, wherein the heater is an integrated member in which the resistor that generates heat is buried in an insulating substrate made of Al2O3 or AlN.

15. The image forming apparatus according to claim 5, wherein:

the fixing member is a rotary member including a conductive layer, the heating portion includes a coil that generates an alternating magnetic field when applied with an alternating voltage, such that the conductive layer applied with the alternating magnetic field is heated through induction heating, the image forming apparatus further includes a facing member configured to form a nip portion between the facing member and the rotary member, and the image forming apparatus is configured to nip and convey the recording material in the nip portion by the rotary member and the facing member such that the toner image is fixed to the recording material by the rotary member heated through the induction heating.

* * * * *